US006308791B1

(12) United States Patent
Spletzer et al.

(10) Patent No.: US 6,308,791 B1
(45) Date of Patent: Oct. 30, 2001

(54) STEERABLE VERTICAL TO HORIZONTAL ENERGY TRANSDUCER FOR MOBILE ROBOTS

(75) Inventors: Barry L. Spletzer; Gary J. Fischer; John T. Feddema, all of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/306,674

(22) Filed: May 6, 1999

(51) Int. Cl.[7] .................................................. B62D 57/02
(52) U.S. Cl. .................................. 180/8.1; 180/7.1; 901/1
(58) Field of Search ............................... 180/7.1, 7.3, 8.1, 180/8.2, 8.5, 8.6; 901/1

(56) References Cited

U.S. PATENT DOCUMENTS

| | | | |
|---|---|---|---|
| 1,511,928 | * 10/1924 | Zboril . | |
| 4,517,537 | 5/1985 | Weiser . | |
| 4,651,589 | * 3/1987 | Lambert | 180/7.1 |
| 4,662,465 | * 5/1987 | Stewart | 180/8.1 |
| 4,792,776 | 12/1988 | Lueneburger . | |
| 4,827,232 | 5/1989 | Minks . | |
| 4,832,168 | * 5/1989 | Farmer | 180/7.1 |
| 4,834,200 | * 5/1989 | Kajita | 180/8.1 |
| 5,083,104 | 1/1992 | Bassino . | |
| 5,361,186 | * 11/1994 | Tanie et al. | 180/8.1 |
| 5,758,734 | * 6/1998 | Hong et al. | 180/8.1 |

OTHER PUBLICATIONS

Horschel DS, Little CQ, Boissiere PT, Advanced Operator Interfaces for a Remote Mobile Manipulation Robot, SAE Technical Paper Series 951572, 25th International Conference on Enviromental Systems, San Diego, CA, Jul. 10–13, 1995.
Barry RE, Little CQ, Jones, JP, Wilson CW, Rapid World Modelling from a Mobile Platform, IEEE International Conference on Robotics and Automation, Proceedings on CD and WWW, Apr. 20–25, 1997.
Porter–Cable, Cordless Finish Nailer Instruction Manual.

* cited by examiner

Primary Examiner—Anne Marie Boehler
(74) Attorney, Agent, or Firm—V. Gerald Grafe

(57) ABSTRACT

The present invention provides a steerable vertical to horizontal energy transducer for mobile robots that less complex and requires less power than two degree of freedom tilt mechanisms. The present invention comprises an end effector that, when mounted with a hopping actuator, translates along axis (typically vertical) actuation into combined vertical and horizontal motion. The end effector, or foot, mounts with an end of the actuator that moves toward the support surface (typically a floor or the earth). The foot is shaped so that the first contact with the support surface is off the axis of the actuator. Off-axis contact with the support surface generates an on-axis force (typically resulting in vertical motion) and a moment orthogonal to the axis. The moment initiates a horizontal tumbling motion, and tilts the actuator so that its axis is oriented with a horizontal component and continued actuation generates both vertical and horizontal force.

27 Claims, 32 Drawing Sheets

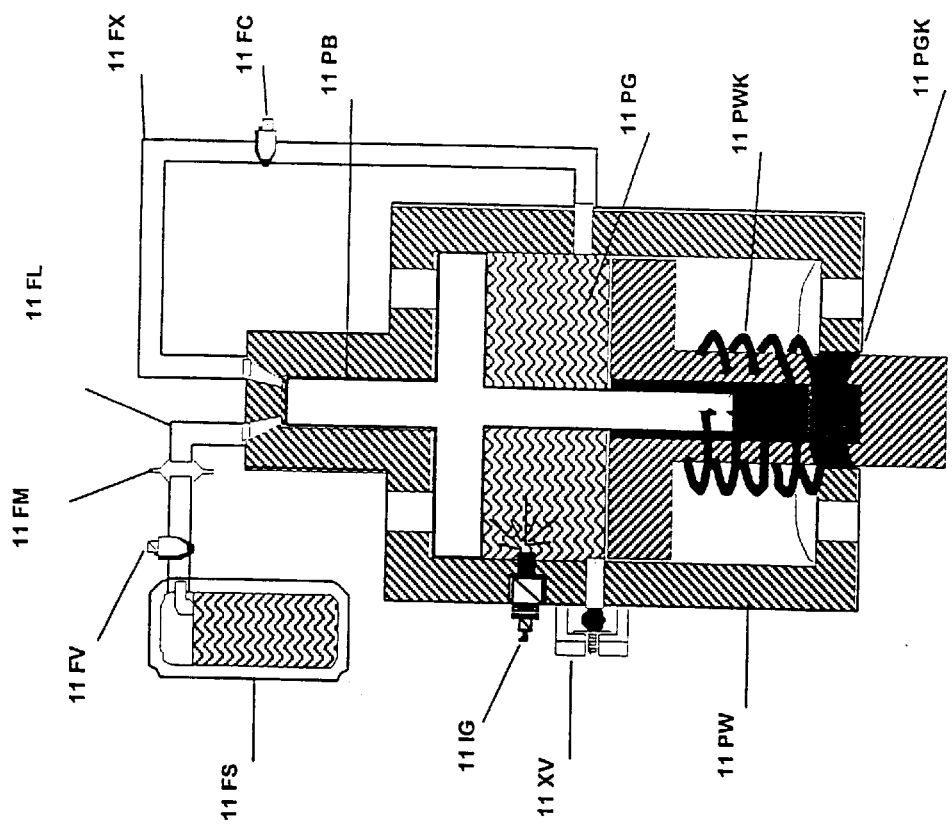

STEERABLE VERTICAL TO HORIZONTAL ENERGY TRANSDUCER FOR MOBILE ROBOTS

This invention was made with Government support under Contract DE-AC04-94AL85000 awarded by the U.S. Department of Energy. The Government has certain rights in the invention.

CROSS-REFERENCE TO RELATED APPLICATIONS

This application is related to applications titled "Hopping Robot," "Miniature High Pressure Electrically Operated Valve," "Passive Orientation Apparatus," and "Misfire Tolerant Combustion-powered Actuation," filed concurrently.

BACKGROUND OF THE INVENTION

This invention relates to the field of mobile robots, specifically the translation of vertical actuation to horizontal translation of a mobile robot.

Robots are conventionally made mobile by wheels, tracks, or legs. Examples of wheeled robots include the RATLER™ robots from Sandia National Laboratories. Examples of legged robots include those developed at Los Alamos National Laboratory. Conventional wheeled, tracked, and legged robots are used in a wide variety of applications.

Conventional robots have limited ability to traverse large obstacles, however. Obstacles much taller than the robot can prevent passage. Also, obstacles with significant horizontal gaps such as trenches can also prevent passage. One solution is to use bigger wheels and a bigger wheelbase. Larger wheels and wheelbase require more drive power, so the entire robot must be larger. Many applications, however, have cost, size, space, or transportation constraints that limit the size of robot than can be used.

One alternative to conventional mobility is hopping mobility. With hopping mobility, the robot jumps to move. Each jump is typically multiples of the robot's dimensions in height and width. Accordingly, the robot can hop over obstacles much larger than a similarly sized conventional robot could traverse. Hopping mobility can allow a small robot to traverse obstacles very large in relation to the robot itself, opening up applications that can not be addressed by conventional robots.

One of many difficulties encountered by contemporary proposed hopping robot designs is providing steerable horizontal mobility to accompany the vertical hopping actuation. The hopping mechanism typically generates a force impulse along an actuation axis. The usual technique involves a two degree of freedom tilt mechanism: the tilt mechanism orients the actuation axis along the desired initial trajectory of the hop. The force impulse then propels the robot along the desired initial trajectory. Two degree of freedom tilting mechanisms can be mechanically complex and can require significant power to operate. Mechanical complexity means increased system cost and weight, and consequently reduced system applicability and range. The power required to operate the tilting mechanism is power not available for other robot functions, and thus detracts from the range or functionality of the robot.

Accordingly, there is a need for a steerable vertical to horizontal energy transducer for mobile robots that less complex and requires less power than two degree of freedom tilt mechanisms.

SUMMARY OF THE INVENTION

The present invention provides a steerable vertical to horizontal energy transducer for mobile robots that is less complex and requires less power than two degree of freedom tilt mechanisms. The present invention comprises an end effector that, when mounted with a hopping actuator, translates along axis (typically vertical) actuation into combined vertical and horizontal motion. The end effector, or foot, mounts with an end of the actuator that moves toward the support surface (typically a floor or the earth). The foot is shaped so that the first contact with the support surface is off the axis of the actuator. Off-axis contact with the support surface generates an on-axis force (typically resulting in vertical motion) and a moment orthogonal to the axis. The moment initiates a horizontal tumbling motion, and tilts the actuator so that its axis is oriented with a horizontal component and continued actuation generates both vertical and horizontal acceleration.

The use of an appropriately-shaped foot allows one direction of tilt to be fixed by the foot, obviating one of the conventional approach's required degrees of freedom. Directing the motion in a specific direction with the present invention involves the simple rotation of the foot, a single degree of freedom actuation well suited for low cost, low energy actuation.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a steerable vertical to horizontal energy transducer for mobile robots that is less complex and requires less power than two degree of freedom tilt mechanisms. Vertical energy is translated into horizontal motion by a foot that causes vertical actuation to generate a moment orthogonal to the vertical actuation axis and further can cause the actuation axis to tilt from vertical. Changing the direction of horizontal motion requires only that the foot be rotated about the actuation axis, a one degree of freedom actuation well-suited for low-cost, low-energy applications.

Those skilled in the art will appreciate many and varied applications where the present invention is advantageous. The present invention is described below in the context of a robot with hopping mobility, one of the many applications for the present invention.

Figure 1:
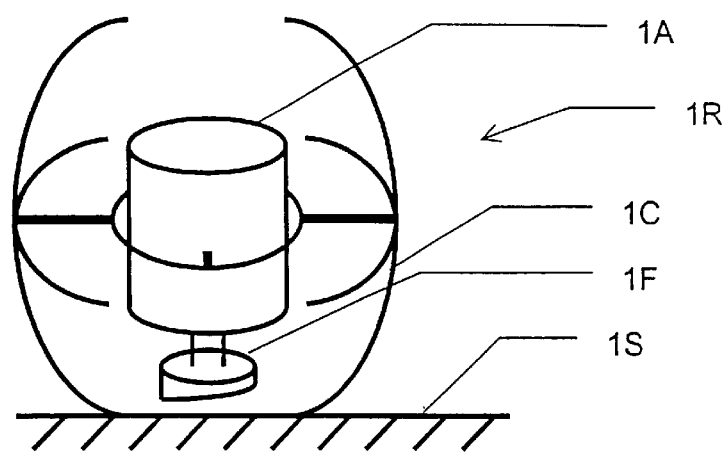
FIG. 1 is a schematic representation of a hopping robot.

FIG. 1 is a schematic representation of a hopping robot. Robot 1R comprises a faceted cage 1C with a linear actuator 1A gimbal mounted therewith. Faceted cage 1C is shaped so that it comes to rest in a stable orientation (e.g., on one of its facets) from an arbitrary initial orientation. Gimbal mounting of linear actuator 1A with faceted cage 1C allows gravity to return linear actuator 1A to a known orientation (e.g., vertical) once the faceted cage 1C reaches a stable orientation. Linear actuator 1A comprises a force transducer 1F adapted to couple energy from linear actuator 1A to a supporting surface 1S. For example, force transducer 1F can be a foot mechanically coupled with linear actuator 1A and striking the ground to couple energy thereto. In another example, force transducer 1F can be a gas or fluid jet coupling energy from linear actuator 1A to the ground or to a viscous media, or can be direct impulse driven as in rocket propulsion.

Figure 2:
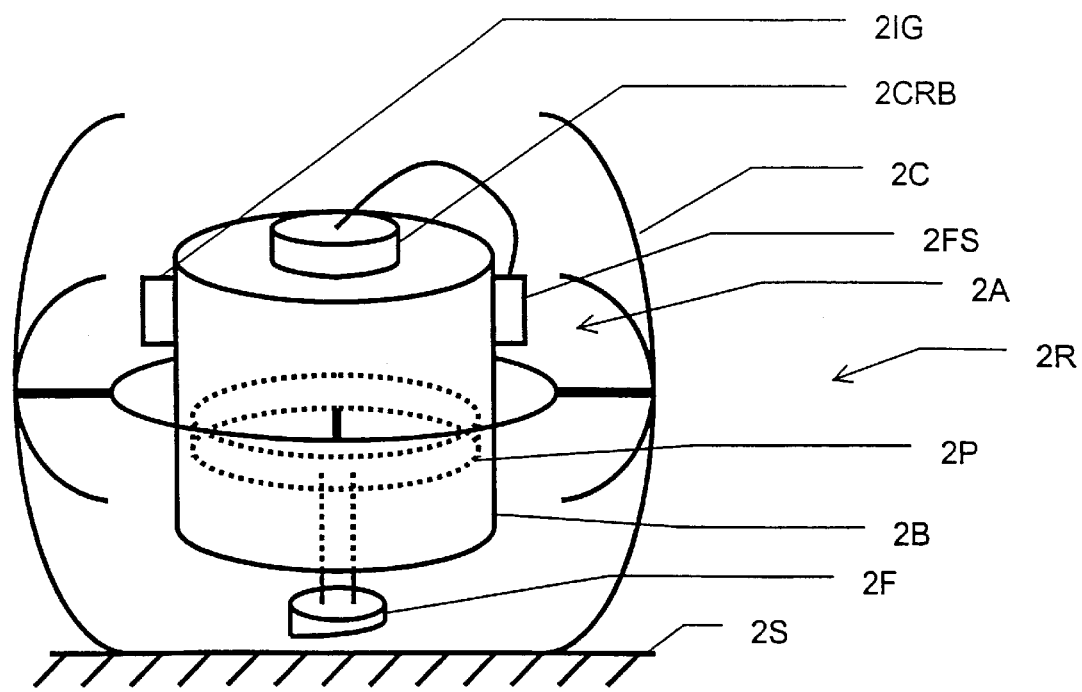
FIG. 2 is a schematic representation of a hopping robot.

FIG. 2 is a schematic representation of a hopping robot. Robot 2R comprises a faceted cage 2C similar to that discussed above. A combustion-powered linear actuator 2A is gimbal mounted with faceted cage 2C. Combustion-powered linear actuator 2A comprises a body 2B with a power piston 2P mounted therein, together defining a combustion chamber 2CX. A carburetion system 2CRB draws fuel from fuel system 2FS and delivers it to combustion chamber 2CX in a state suitable for combustion. Ignition system 21G initiates combustion in combustion chamber 2CX. Combustion in combustion chamber 2CX forces power piston 2P downward, forcing foot 2F against a supporting surface 2S such as the ground, imparting vertical acceleration to robot 2R. Foot 2F has its distal end angled so that initial contact with supporting surface 2S is not coaxial with the center of gravity of robot 2R, thus imparting a moment to robot 2R. The moment tilts robot 2R so that continued acceleration from foot 2F is inclined from vertical, allowing directional hopping. Robot 2R can assume arbitrary orientations during a hop since faceted cage 2C will return to a stable orientation on landing.

Design guidance and example embodiments of the several subsystems of a hopping robot are presented below.

Physics of Hopping Mobility

The following simple analysis shows the feasibility of hopping mobility. As a simple example, consider a vehicle that launches itself with initial velocity V at angle θ to the horizontal to perform a hop. Assume the vehicle follows a simple parabolic free fall trajectory, is unaffected by air resistance, and does not recover any of the expended energy upon landing. For this scenario the required energy to travel a given distance can be bounded. The horizontal range R for a single hop is given by Equation phys1.

$$R = \frac{V^2 \sin 2\theta}{g} \qquad \text{Equation phys 1}$$

The relationship between maximum height h attained and launch velocity is given by Equation phys2.

$$h = \frac{V^2 \sin^2 \theta}{2g} \qquad \text{Equation phys 2}$$

The mechanical energy required to do the hop is the kinetic energy of the vehicle, as in Equation phys3.

$$E = \frac{1}{2}mV^2 \qquad \text{Equation phys 3}$$

In Equation phys3, m is the vehicle mass. The specific energy (γ), that is, the energy per unit mass of vehicle, to produce a hop is given by Equation phys4.

$$\gamma = \frac{E}{m} = \frac{gR}{2\sin 2\theta} \qquad \text{Equation phys 4}$$

This last relation provides some interesting insights. First, the specific energy is independent of the launch velocity and depends only on the launch angle, gravitational acceleration and the range of the hop. Second, since the specific energy is proportional to the hop range, the total energy required to cover a given distance is independent of the size of the individual hops. This is seen by considering the required energy to cover a distance L. If the distance is covered in n hops, the range of each hop is L/n and the energy for a single hop must be multiplied by n to yield total energy as in Equation phys5.

$$\lambda = n\gamma = n\frac{g\frac{L}{n}}{2\sin 2\theta} = \frac{gL}{2\sin 2\theta} \qquad \text{Equation phys5}$$

In this idealized situation the individual hop height and range does not affect the overall required energy and may be selected to satisfy other design parameters. In practice, high velocity hops can be undesirable due to increased air drag, and low velocity hops can expend too much energy in frictional effects with ground objects. The minimum energy required is for a launch angle of 45 degrees (where sin 2θ is maximum). Since hopping is achieved by the piston foot pressing against the ground, an adequate coefficient of friction must be available so the foot will not slip. This means that a launch angle of 45 degrees can be too shallow since it requires a coefficient of friction of 1.0 to preclude slipping. A more practical value of 60 degrees can be assumed resulting in Equation phys6.

$$\lambda = \frac{gL}{\sqrt{3}} = 0.58 gL \qquad \text{Equation phys6}$$

At this point, the analysis does not include the energy lost by coupling the hopping action to the ground, the power transmission system, or possible inefficiencies of the overall power system. By this simple analysis, the energy required to traverse a given distance is 58% of the energy needed to elevate the vehicle that distance vertically since the energy required for a vertical launch of L is as in Equation phys7.

$$\lambda_{vert} = gL \qquad \text{Equation phys7}$$

The energy required for hopping mobility is significantly larger than that needed for rolling mobility in macroscale. For example, in the terms derived above, the specific energy for a 2000 pound automobile at 25 mpg is given by Equation phys8.

$$\lambda_{auto} = 0.09 gL \qquad \text{Equation phys8}$$

In other words, hopping mobility according to this simple analysis is only 1/6 as efficient as a common automobile, giving an effective mileage of a 4 mpg. On the other hand, the wheeled mobility of an automobile is not always suitable in small scale apparatus. Further, the ability of hopping mobility to negotiate obstacles many times its own height is a significant advantage over automobile-like wheeled mobility.

Faceted Cage

One of the properties of a hopping robot that allows it to be relatively simple is the fact that it does not control its orientation during flight or landing. Because of this, the hopping robot can be expected to land in a random orientation. While this simplifies many aspects of the operation it adds the requirement of a righting system to prepare the hopping robot for the next hop. As with the subsystems discussed previously, the righting system has the potential for requiring significant amounts of energy. Typical systems might require actuators to roll the hopping robot over into the appropriate position. An example of such a righting system is the Pathfinder mission to Mars where the lander is a tetrahedron with three of the triangular sides hinged to the edges of the fourth side. Regardless of which side the vehicle lands on, actuation of all three hinged panels simply rolls the tetrahedron onto its base. This system has the advantage of not requiring sensors to determine what actuation is needed to right the system. However, it does require significant amounts of energy for each hop.

Passive systems can also be envisioned using a near spherical hopping robot with an offset center of gravity. The Weebles toys that right themselves by means of gravity and the shape of the body are an example of this. Such a system can be impractical for a hopping robot since the amount of righting torque generated is relatively small so the hopping robot will not right itself on soft ground. Further, the fact that the outside shell must be near spherical (or at least everywhere convex) means that the hopping robot could not negotiate significant grades since it would simply roll down the hill.

Figure 3:
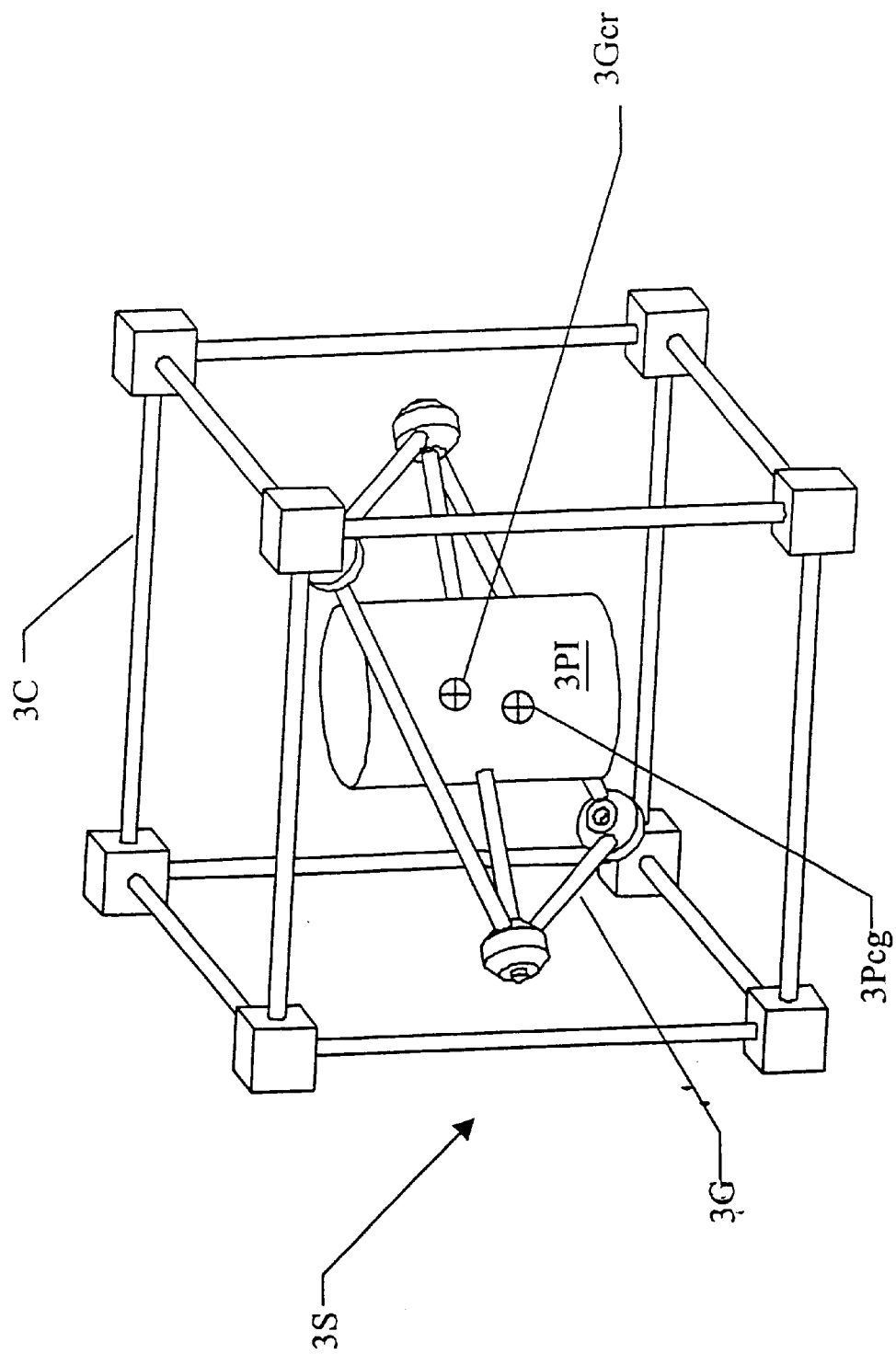
FIG. 3 is a schematic representation of a passive orientation apparatus.

One embodiment of a passive righting system is shown in FIG. 3. A faceted cage 3C establishes a stable position for the system 3S, independent of the initial arbitrary orientation. A faceted cage is one having a shape such that the system is stable when resting on at least one facet, and that any unstable orientation of the cage reaches stability by orienting the cage to rest on a stable facet. FIG. 3 shows a cube, one example of a shape suitable for the faceted cage; other shapes are discussed below. A gimbal 3G mounts with the faceted cage 3C and is adapted to hold the payload 3P with the payload's center of gravity 3Pcg not coincident with the gimbal's center of rotation 3Gcr. A gimbal is a fitting or arrangement of fittings that allow rotation of the payload about one or more axes. Examples include universal joints, bearings on mutually orthogonal axes, gyroscope mounts, and some virtual reality simulators. Gravity acting on the payload 3P causes rotation of the gimbal's components, consequently forcing the payload 3P to a known orientation.

In use, the system 3S can begin at any initial orientation, for example by being thrown, dropped, or launched through the air. Once in contact with a supporting surface such as the ground, gravity acting on the center of gravity of the system 3S will force the cage 3C to rest on one of the faces of the cube (the facets of the cage). The faceted cage 3C thus assures that the system 3S reaches a stable orientation, starting from an arbitrary initial orientation and even if placed on significant slopes or irregular or uneven surfaces. Gravity also acts on the center of gravity of the payload, causing the payload to rotate in the gimbal until the payload center of gravity is at its lowest point. The combined effects of the faceted cage and the gimbal establish the payload in a known, determined orientation independent of the roughness of the terrain or the initial orientation of the system, without requiring energy or other actuation or movement other than gravity. An overly steep slope can cause a faceted cage to roll. Lowering the overall center of gravity relative to the faceted cage's geometric center can produce a system that remains stable on very steep slopes. Various faceted cage shapes also have various tolerance for slopes due to varying geometric relationships.

Faceted Cage Shapes

Numerous shapes meet the requirements for a faceted cage. Several are discussed below; others will be apparent to those skilled in the art from the discussion provided herein and from practice of the invention.

CUBE

As discussed previously, a faceted cage can comprise a cube, where each face is open of the edges are made of a substantially rigid material, for example of graphite epoxy rods. Similar to casting a die, a faceted cage in the shape of a cube lands on one of the six open faces in contact with the ground. Because one of the faces is parallel to the ground, and because the ground is inclined at 45 degrees or less (else the cage will roll), a gimbal with only limited motion is assured to be able to position the payload vertically. A first gimbal frame can have a diamond shape with, for example, graphite epoxy rods ad the edges of the diamond. The end points of the diamond can be attached to the cube at opposite corners using bearings that allow the diamond to rotate about its long axis. The angle between the adjacent edges at the bearings is the arc tangent of twice the square root of two, or about 70.5 degrees. This angle allows for the largest possible gimbal size that can rotate freely within the cubical faceted cage. A second gimbal axis can pass through the remaining two vertices of the diamond. The second axis supports the payload. Because the first gimbal axis has full 360 degree rotation, the second gimbal axis only needs a range of 90 degrees. For the righting system to function, the center of gravity of what must be below the second gimbal axis. The second gimbal axis can pass through the center of the cube. The cubical faceted cage, or any faceted shape, is stable on a slope until the slope is such that the center of gravity is directly above any one of the edges of the face in contact with the ground. For a cubical faceted cage this occurs at slopes of 45 degrees, independent of the dimensions of the cube or payload.

TETRAHEDRON

A faceted cage according to the present invention can comprise a tetrahedron. A tetrahedral faceted cage can be stable at greater slopes than a cubical faceted cage because a tetrahedral faceted cage can have a lower center of gravity. For a tetrahedral faceted cage, a first gimbal axis can terminate at the midpoint of opposite edges of the faces. A tetrahedral faceted cage can use a diamond-shaped gimbal frame similar to that in a cubical faceted cage. Like a cubical faceted cage, an included angle of about 70.5 degrees yields the largest possible shape that can rotate freely inside the tetrahedral faceted cage. A tetrahedral faceted cage can require a large cage for given payload dimensions.

TRUNCATED TETRAHEDRON

Figure 4:
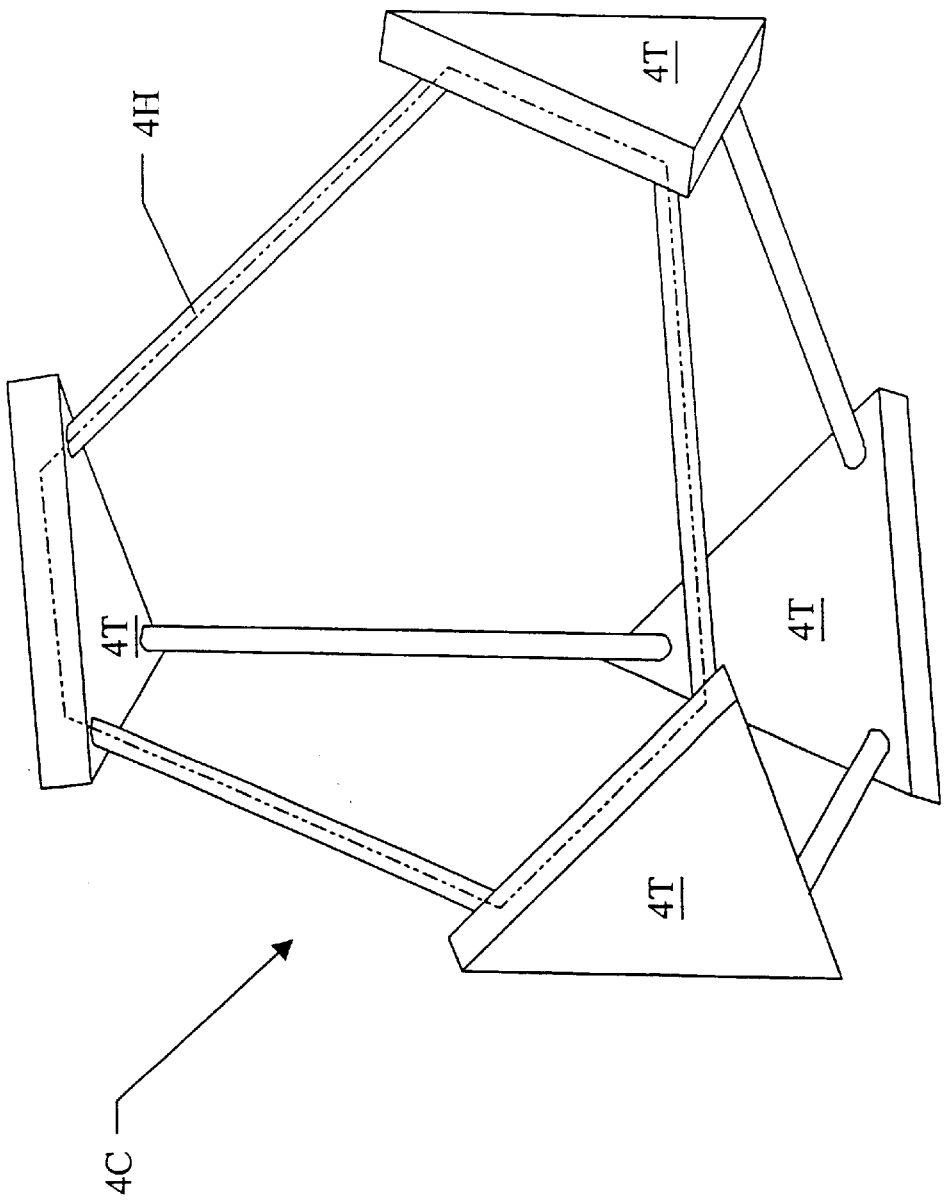
FIG. 4 is a schematic representation of a passive orientation apparatus.

A faceted cage can also comprise a truncated tetrahedron as shown in FIG. 4, and reduce the overall cage size required for a given payload as compared with a tetrahedral faceted cage. In truncated tetrahedron 4C the vertices of a tetrahedron are flattened, changing from points to equilateral triangles 4T, until the original equilateral triangular sides become regular hexagons (e.g., 4H). This reduces the overall size of the faceted cage without compromising the resistance to rolling down slopes. A truncated tetrahedral faceted cage presents the flattened vertices (equilateral triangles) as additional facets on which the faceted cage can rest. Very shallow pyramids can be placed on these additional facets, if desired, to assure that the faceted cage is not stable on the new facets.

Figure 5:
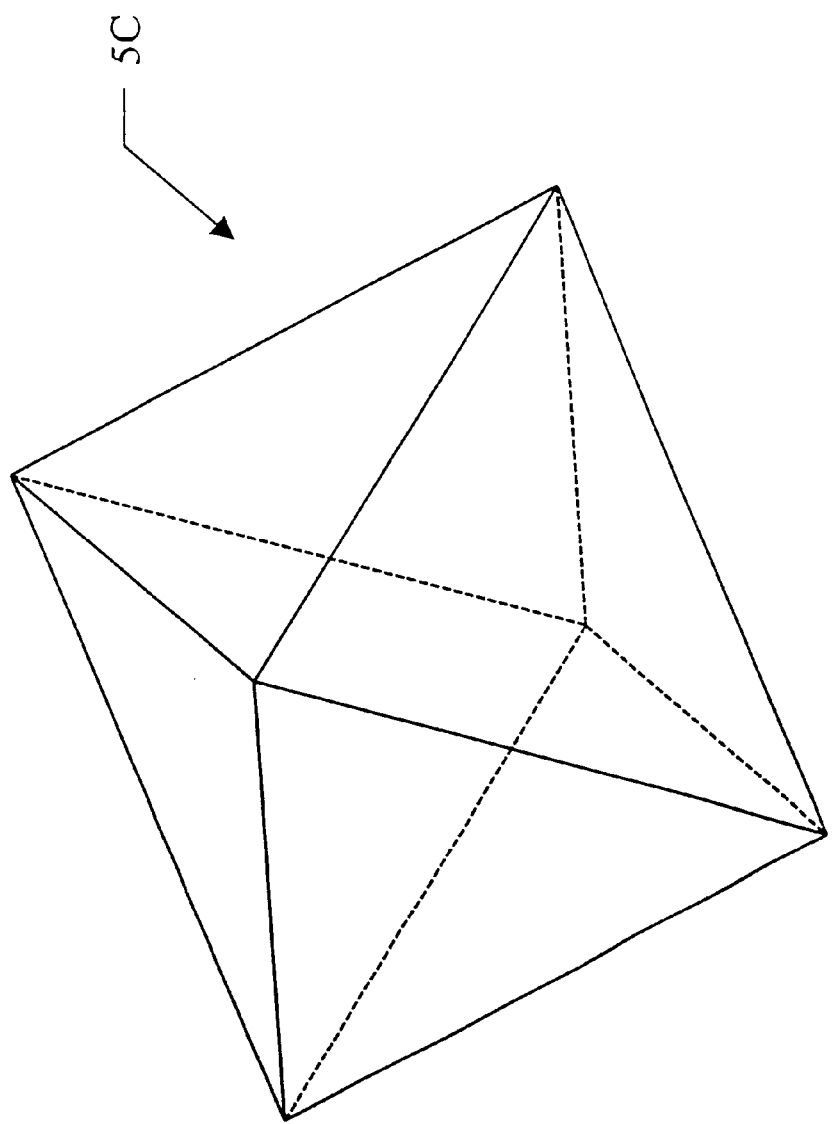
FIG. 5 is a schematic representation of a passive orientation apparatus.

The payload volume can be further increased by extending the truncation of the tetrahedron until the new hexagonal sides become triangular. The resulting shape is a regular octahedron, as shown in FIG. 5, with eight equilateral triangles for the sides. A faceted cage 5C comprising such a shape can be less stable on steep slopes than the previously-described shapes, however.

RHOMBIC DODECAHEDRON

Figure 6:
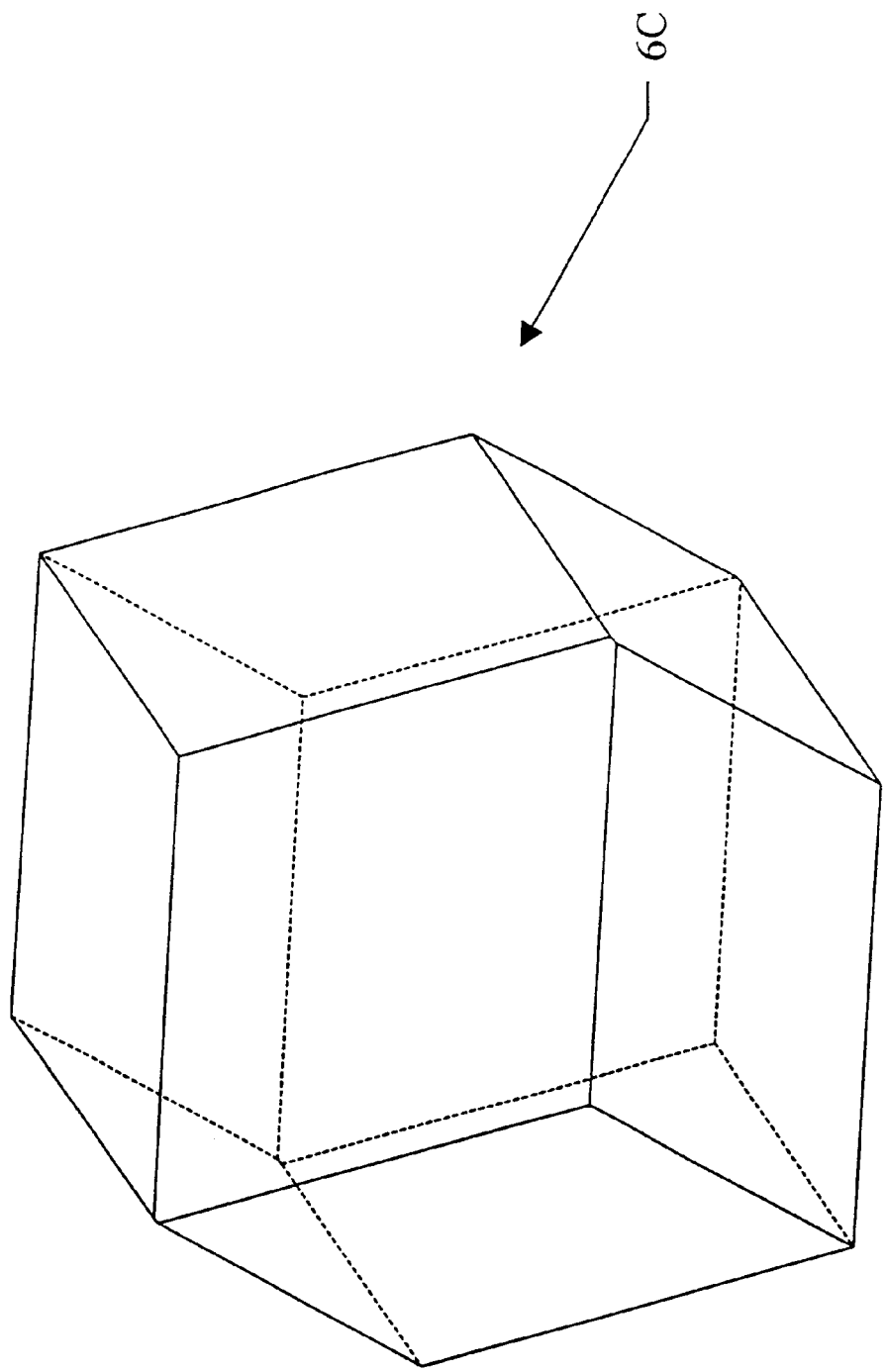
FIG. 6 is a schematic representation of a passive orientation apparatus.

A faceted cage 6C according to the present invention can comprise a rhombic dodecahedron, as shown in FIG. 6.

PRISM

Figure 7:
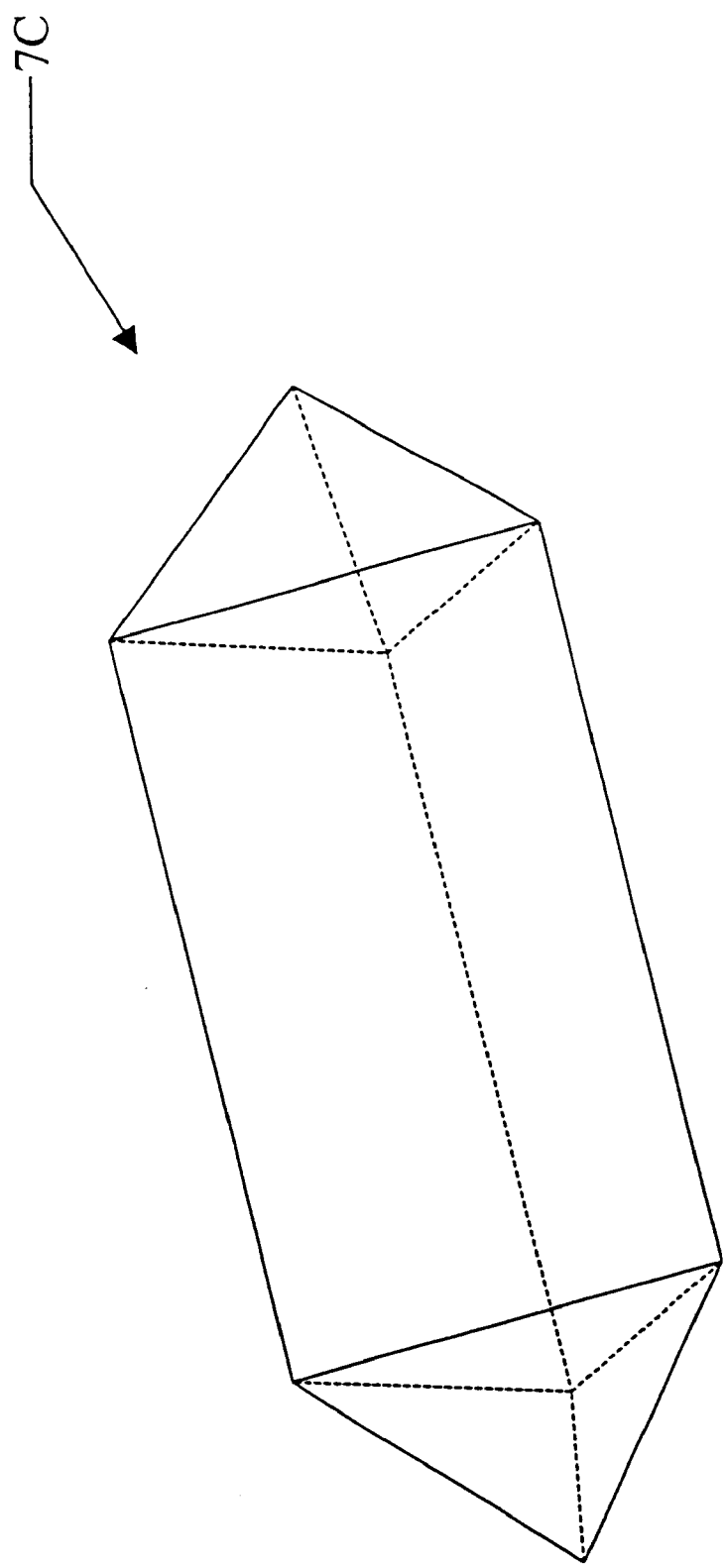
FIG. 7 is a schematic representation of a passive orientation apparatus.

A faceted cage 7C according to the present invention can comprise a pointed prism. A pointed prism is a prismatic structure with an equilateral triangle or other polygonal cross section and a flattened pyramid attached to each end of the main prism, as shown in FIG. 7. The pyramids prevent the faceted cage from balancing on the end of the prism, assuring that one of the sides of the prism is always in contact with the supporting surface. A first axis of the gimbal system can run parallel to the axis of the prism and the gimbal cage can be rectangular rather than diamond-shaped. A second axis can pass through the center of the rectangle and intersect the edges of the rectangle at their center point.

SEPARATED HEMISPHERES

Figure 8:
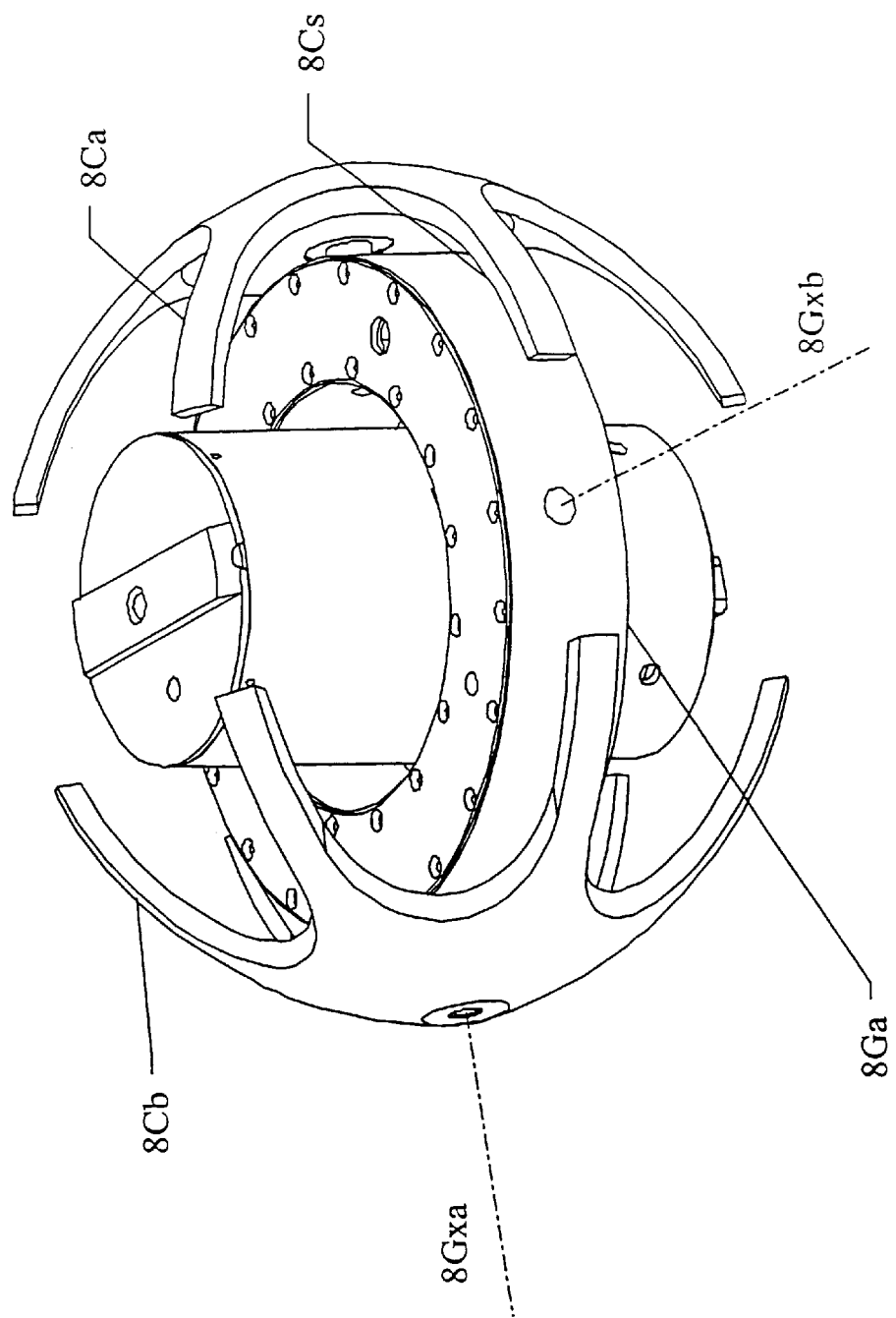
FIG. 8 is a schematic representation of a passive orientation apparatus.

Faceted cages according to the present invention need not be polyhedral (consisting of flat faces). A faceted cage according to the present invention can comprise curved or warped faces. For example, construct a sphere comprising at least two circular rings that intersect only at their poles. Divide the sphere around its equator into two hemispheres and separate the two hemispheres to produce a faceted cage 8C shown with a payload 8P in FIG. 8. A gimbal cage 8Ga can have a first axis 8GXa that passes through the poles of the hemispheres 8Ca, 8Cb. The corresponding part of a gimbal cage 8Ca can be circular in shape. A second gimbal axis 8GXb can be normal to the first axis 8GXa, passing through the diameter of the circular part of the gimbal cage 8Ga. The use of curved facets allows for larger payload volume for a given overall faceted cage volume. Further, the hemispheres 8Ca, 8Cb need be connected only through the gimbal, reducing possible interference between the payload and the faceted cage.

SPLETZEROID

A faceted cage according to the present invention can comprise an optimization of the separated hemispherical shape described above. The optimized shape, termed a spletzeroid, comprises rings having non-circular shapes such that the faceted cage provides a substantially uniform moment while righting the overall system. The shape assures that the normal to the point of contact with a flat supporting surface always passes a set distance from the center of gravity of the overall system. This constraint produces a spletzeroid, a circular spiral like that shown in FIG. 9 and defined below.

Figure 9:
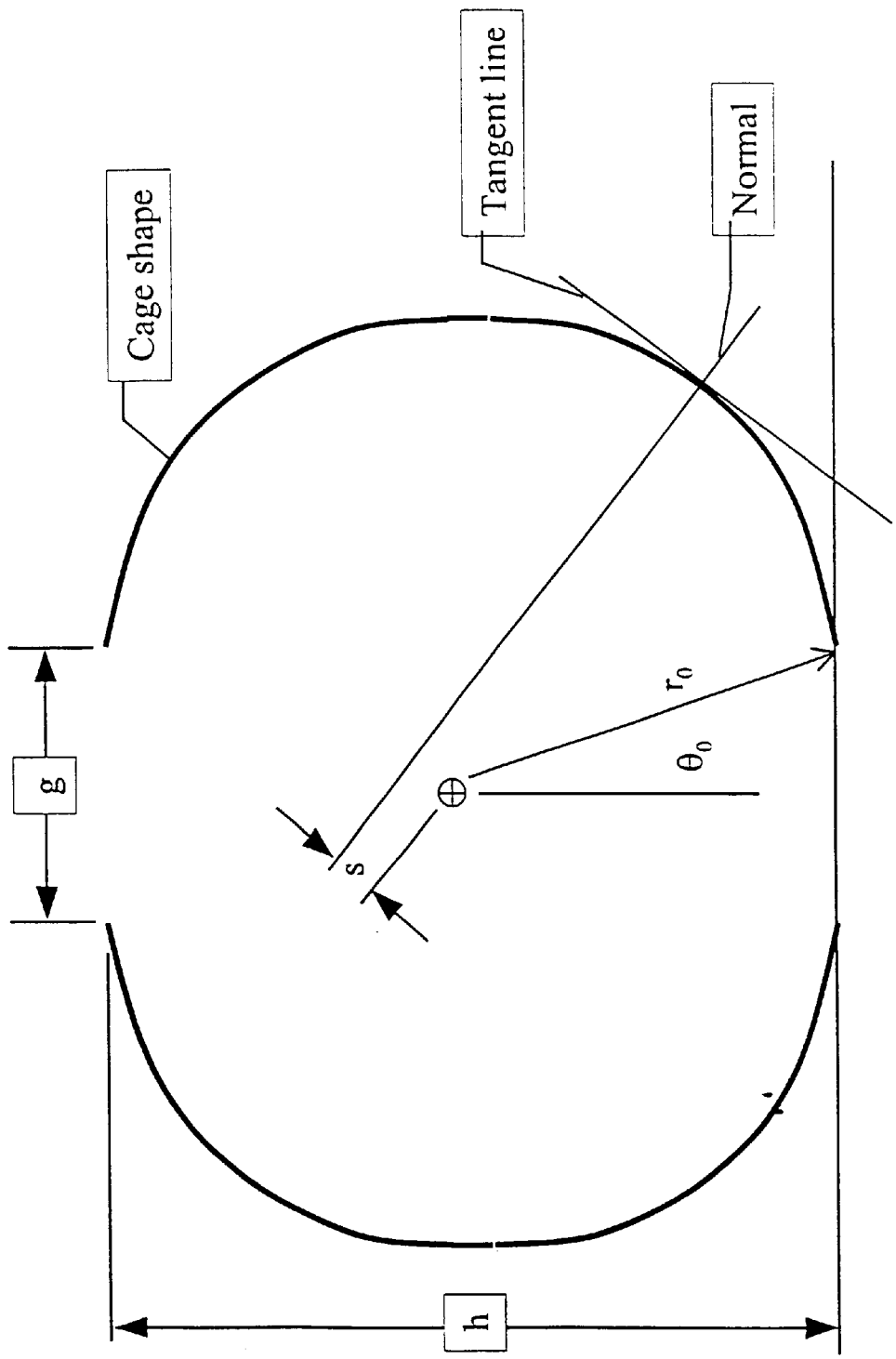
FIG. 9 is a schematic representation of a passive orientation apparatus.

Referring to FIG. 9 for terms:

s—a measure of the writing moment generated by the system. Specifically this is the perpendicular distance from the center of gravity to the vertical line passing to the point of contact of the cage with the ground.

r—the equation for the cage shape is measured, in polar coordinates any coordinate r is the radius measured from the center gravity (and the geometric center) of the system $\rho$—a non-dimensional radius variable defined in Equation cage1.

$$\rho = \frac{r}{s} \qquad \text{Equation cage 1}$$

g—The gap between the end cages h—to the overall height of the finished cage $\theta_0$—the initial polar angle measured to the end of the cage, defined by Equation cage2.

$$\theta_0 = \arctan\left(\frac{g}{h}\right) \qquad \text{Equation cage 2}$$

$r_0$—The initial radius measured to the end of the cage defined by Equation cage3.

$$r_0 = \frac{1}{2}\sqrt{h^2 + g^2} \qquad \text{Equation cage 3}$$

$\rho_0$—the non-dimensional initial radius defined by Equation cage4.

$$\rho_0 = \frac{r_0}{s} \quad \text{Equation cage 4}$$

The resulting equation for the cage shape gives θ as a function of ρ in the form of Equation cage5.

$$\theta = \left(\sqrt{\rho^2 - 1} - \arccos\left(\frac{1}{\rho}\right)\right) - \left(\sqrt{\rho_0^2 - 1} - \arccos\left(\frac{1}{\rho_0}\right)\right) + \theta_0 \quad \text{Equation cage 5}$$

One final adjustment is required to turn this equation into the shape of a strut for a cage. This equation is the projected shape of cage. When struts are used the projected shape of the strut is not the same as the actual strut shape because of the angle of the strut to the vertical. This results in a constant factor multiplier factored into the distance of the strut from the cage axis.

Gimbal

Various gimbal structures and materials will be appreciated by those skilled in the art from the above descriptions, figures, and from practice of the invention. Low friction or anti-friction bearings can be used instead of journal bearings to benefit from lower static torque characteristics. Low static torque can be important because it can allow the center of gravity of the payload to be positioned close to the second gimbal axis, minimizing the overall faceted cage size required.

Skin

Faceted cages made with struts can encounter difficulties passively righting the system if the terrain has irregularities that intrude between the struts. For example, grass, trees, and other vegetation can pierce the cage between struts and prevent the cage from resting on a stable facet. As another example, rough terrain can interfere with the operation of the gimbal even if the cage is resting on a stable facet. To counter these undesirable effects, a skin can be placed over the cage. The skin can be complete, or can cover only selected portions of the cage. The skin can be of a material that does not interfere with the operation of the payload. For example, a transparent skin can be used if the payload relies on light energy (such as photovoltaic power) or optical sensing (such as a camera). As another example, a flexible skin can be used if the payload uses mechanical actuation (such as a hopping mechanism). A porous skin can be used if the payload requires fluid or gas exchange with its surroundings, such as some sensors and combustion powered devices.

Linear Actuation

A hopping robot according to the present invention can use an electrically-powered linear actuator. Electrically-powered linear actuators are known to those skilled in the art. Electrically-powered linear actuators can be ill-suited to hopping mobility, however, as discussed below. Combustion-powered linear actuators are described below that can be advantageous in a hopping robot.

Figure 10:
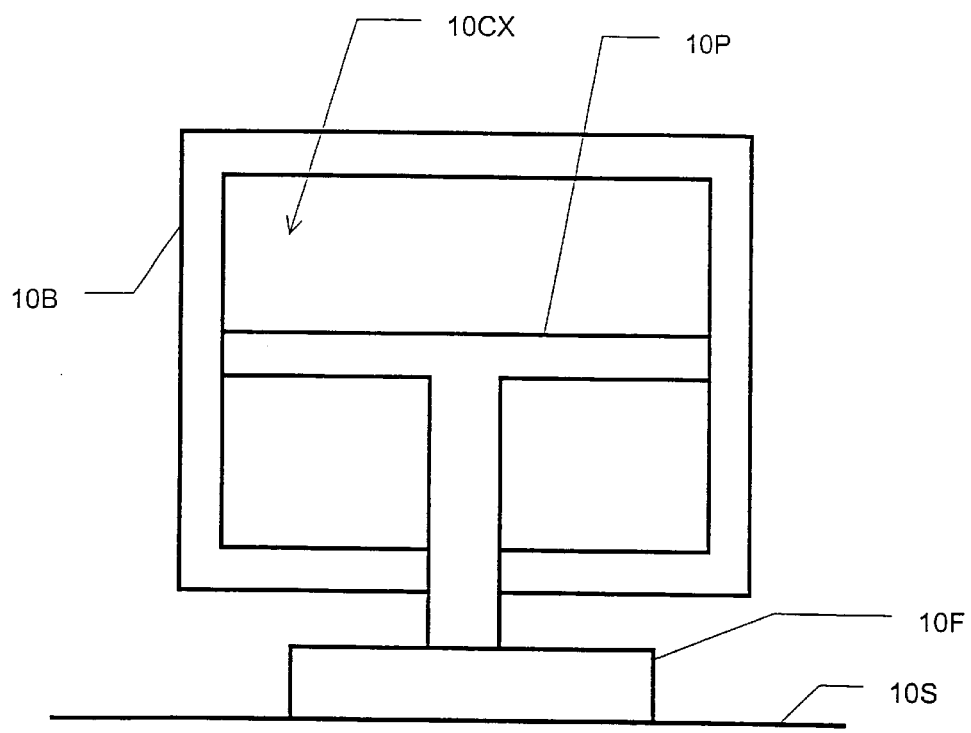
FIG. 10 is a schematic representation of a combustion-powered hopping robot.

Tremendous advances in range and obstacle traversal capability can be achieved by using a vehicle based on a combustion powered linear piston that provides hopping actuation by having the piston rod in direct contact with the ground. FIG. 10 shows a schematic of this idea. An internal cavity in body 10B combines with power piston 10P to define a combustion chamber 10CX. A fuel-air mixture in combustion chamber 10CX expands once ignited, forcing power piston 10P down and consequently forcing foot 10F against a supporting surface 10S. Continued expansion forces body 10B up, imparting vertical acceleration to body 10B and any attached robot or other components. Combustible fuel, compared with battery electrical power, has a very high energy density of the fuel and a high power density of combustion. Hydrocarbon fuels have an energy density about 100 times that of batteries and, unlike batteries, the energy density is invariant with increasing power. The high energy and power density contribute to achieving an extended vehicle range.

Feasibility of Combustion Powered Actuation

A propulsion system based on the adiabatic expansion of the products of hydrocarbon combustion illustrates that sufficient energy for hopping mobility can be available. Consider a simple piston fueled by a hydrocarbon-air mixture where the piston rod pushes directly against the ground to launch the vehicle. The results of the analysis are essentially identical for most common hydrocarbon fuels since the energy content of all hydrocarbon fuels is approximately the same. The hydrocarbon-air reaction, assuming air to be 20% oxygen and 80% nitrogen, is given by Equation feas1.

$$C_m H_n + \left(m + \frac{n}{4}\right)O_2 + 4\left(m + \frac{n}{4}\right)N_2 \rightarrow \quad \text{Equation feas 1}$$
$$mCO_2 + \frac{n}{2}H_2O + 4\left(m + \frac{n}{4}\right)N_2$$

The mole fraction of the products to reactants is given by Equation feas2.

$$\alpha(m, n) = \frac{5m + \frac{3}{2}n}{1 + 5m + \frac{5}{4}n} = 1 + \frac{n-1}{20m + 5n + 1} \quad \text{Equation feas 2}$$

Equation 10 shows that the mole ratio is approximately equal to 1.0 for all common fuels. The ratio of gaseous fuel volume to air volume is the mole ratio of fuel and air, as in Equation feas3.

$$\delta(m, n) = \frac{1}{5m + \frac{5}{4}n} \quad \text{Equation feas 3}$$

The density of gaseous fuel at standard conditions is given by Equation feas4.

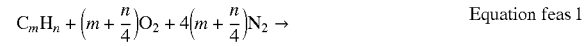
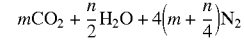

The required specific fuel (μ), which is the ratio of fuel mass to combustion volume, comes directly from the left side of the chemical reaction, as in Equation feas5.

$$\mu(m, n) = \frac{M_{fuel}}{v} \quad \text{Equation feas 5}$$
$$= \frac{(12m + n)\,\text{gm fuel}}{144\left(m + \frac{n}{4}\right)\text{gm air}} \cdot \frac{29\,\text{gm air}}{22.4\,\text{liter air}}$$
$$= 9 \times 10^{-6}\left(12 + \frac{8n}{4m + n}\right)\frac{\text{gm}}{\text{cm}^3}$$

For the most commonly used fuels, the above parameters and other important physical properties are listed in Table feas1.

TABLE feas1

| Fuel | Propane | Butane | Propyne |
|---|---|---|---|
| Composition | $C_3H_8$ | $C_4H_{10}$ | $C_3H_4$ |
| Reactant-product mole ratio ($\alpha$) | 1.038 | 1.045 | 1.00 |
| Specific fuel volume ($\delta$, cc/cc) | 0.040 | 0.031 | 0.050 |
| Specific fuel mass ($\mu$, mg/cc) | 0.057 | 0.058 | 0.065 |
| Gaseous fuel density ($\rho_g$, mg/cc) | 1.96 | 2.59 | 1.79 |
| Liquid fuel density ($\rho_l$, gm/cc) | 0.585 | 0.573 | 0.571 |

The observed flame temperature for the hydrocarbon-air reaction ($T_f$) is 2150 K. This value is relatively insensitive to fuel type and is quite approximate so a single value of 2150 K will be used for all fuels. This observed flame temperature is limited controlled by the dissociation of the combustion products. Assuming initial atmospheric pressure ($P_a=1$ atm) and temperature ($T_a=300$ K) the pressure following constant volume combustion, that is before the expansion of the volume occurs, is given by Equation feas6.

$$P_c = \frac{T_f}{T_a} P_a \alpha \quad \text{Equation feas 6}$$

As the piston moves downward the gas undergoes adiabatic expansion. The absolute pressure during the expansion ($P_e$) as a function of the ratio of the instantaneous volume to the initial volume ($\upsilon$) is given by Equation feas7.

$$P = \frac{P_c}{\upsilon^k} \quad \text{Equation feas 7}$$

In Equation feas7, k is the specific heat ratio (here k=1.4). The maximum available specific work ($\beta$) can be determined by integrating the gage pressure over $\upsilon$ from the initial volume ($\upsilon=1$) to the point where the pressure matches the ambient (for these conditions $\upsilon_{max}=4.08$). This results in Equation feas8.

$$\beta_{max} = \int_1^{\upsilon_{max}} \left(\frac{P_c}{\upsilon^k} - P_a\right) d\upsilon \quad \text{Equation feas 8}$$
$$= \frac{P_c}{1-k}(\upsilon_{max}^{1-k} - 1) - P_a(\upsilon_{max} - 1)$$
$$= 0.47 \frac{\text{joule}}{\text{cm}^3}$$

This is the amount of mechanical energy per initial combustion volume available for a single hop. This value is an underestimate of the actual energy since the observed flame temperature is limited by dissociation of the combustion products. The dissociation means that the temperature-pressure relationship is not that of an ideal gas. Instead, as the expanding gas converts thermal energy into work the temperature drops more slowly than predicted since re-association of the combustion products adds additional energy to the system. This energy can be substantial amounting to perhaps 50 percent of the ideal gas energy estimate. The simple integral here ignores these effects and produces an underestimate of available mechanical work. As a conservative estimate, the above will suffice.

Combining this with the range-energy relation yields a relation among displacement volume (v), vehicle mass, and the range of a single hop, given by Equations feas9 and feas10.

$$v\beta = E = \frac{gRm}{\sqrt{3}} \quad \text{Equation feas 9}$$

$$\frac{v}{mR} = \frac{g}{\sqrt{3}\beta} \quad \text{Equation feas 10}$$

To ensure that these results are reasonable, examine the mechanical energy derived from the fuel mass as in Equation feas11.

$$e = \frac{\beta}{\mu} = 6000 \frac{\text{joule}}{\text{gm}} \quad \text{Equation feas 11}$$

This corresponds to a thermodynamic efficiency of 15% which is considered reasonable for this system.

The required specific fuel relationship can be combined with the fuel specific gravity to determine the specific volume of fuel (the ratio of liquid fuel volume to combustion chamber volume) required to perform a hop. This number can be used directly to determine the size of the fuel tank necessary to perform a given number of hops. For propane the specific gravity is 0.58 (other liquid hydrocarbon fuels have very similar specific gravity) and resulting specific fuel volume per hop is given by Equation feas12.

$$v_{fuel} = \frac{\mu}{\rho_{fuel}} = 1.4 \times 10^{-4} \quad \text{Equation feas 12}$$

Accordingly, a vehicle with a fuel tank volume equal to the combustion chamber volume can perform about 7000 hops without refueling. Since the combustion volume is a relatively small fraction of the total vehicle size, this shows the potential for enormous range using combustion driven hopping.

Combining the fuel mass usage with the range relations gives Equation feas13.

$$R_{total} = \frac{\sqrt{3} v\beta}{\text{mg}} = \frac{\sqrt{3} \beta m_{fuel}}{\mu \text{gm}} = 1.1 \cdot 10^6 \kappa \text{ meter} \quad \text{Equation feas 13}$$

In Equation feas13, $\kappa$ is the fraction of the vehicle mass devoted to fuel. This relation assumes perfect coupling of the piston energy into velocity for the launch and complete combustion of the fuel. In reality, this will not occur. Because of this the range of the vehicle will be reduced. This reduction can be estimated conservatively by assuming a coupling efficiency of only 10% (that is, 90 percent of the mechanical energy generated by the piston is lost in the inefficiencies of pushing against the ground) and that only 50% of the fuel in the piston actually burns (lowering the change in temperature by 50%). This gives a relation between fuel fraction and range as in Equation feas14.

$$R = 55 \kappa \text{ km} \quad \text{Equation feas14}$$

Accordingly, a hydrocarbon fueled hopping vehicle where the fuel comprises 10% of the total vehicle mass has a potential range of at least 5.5 km. Even for this small fuel fraction and conservative efficiency estimate the resulting range is very large. The reason for the enormous range when compared to existing battery-powered vehicles is that the energy density of existing high power density batteries is about 1% that of hydrocarbon fuels even after the inherent thermodynamic inefficiency of combustion is considered.

Batteries have the additional disadvantage of generally not having a high enough power density to provide the explosive action necessary for hopping. This can be seen from power versus energy plots (known as Ragone plots) that are occasionally produced for various battery chemistries. Total available battery energy can drop to less than 10% the rated energy if the instantaneous power requirements are too high. This means that a battery powered hopper could require another mechanism such as clockwork or a capacitor to store the energy for a single hop, thus allowing the energy to be released at a sufficient rate to produce the desired hop height.

The use of a combustion system is also attractive since the available power density from combustion is relatively insensitive to scale within this size range. This is evidenced by the fact that internal combustion engines produce nearly constant specific power in displacement sizes ranging from 0.01 cubic inches up to several hundred cubic inches. Also, the analysis of hopping mobility shows that the achievable range is invariant of scale for a given fuel fraction. This means that, with all other parameters held constant, the total available range is the same regardless of overall vehicle size. These rough calculations show that a hopping vehicle according to the present invention can provide enormous increases in range over conventional vehicles.

In addition to combustion using hydrocarbon fuel and air, the possibility also exists to carry an onboard oxidizer to enhance performance. One example of a simple onboard oxidizer is nitrous oxide. Nitrous oxide liquefies under pressure at room temperature and can be stored at moderate pressures similar to the hydrocarbon fuels discussed above. The previous analysis concerning fuel consumption and energy can be repeated for this reaction. Varying quantities of nitrous oxide can be mixed with air to provide a continuous range of anti-density between the air combustion and the pure nitrous oxide combustion. The stoichiometric reaction for hydrocarbon fuel and nitrous oxide is given by Equation feas15.

$$C_mH_n + 2\left(m + \frac{n}{4}\right)N_2O \rightarrow mCO_2 + \frac{n}{2}H_2O + 2\left(m + \frac{n}{4}\right)N_2 \quad \text{Equation feas15}$$

Previously, the mole fraction of the products to reactants for air combustion was shown to be about 1.0. For combustion with nitrous oxide this ratio is given by Equation feas16.

$$\alpha_{N2O}(m, n) = \frac{3m + n}{1 + 2m + \frac{n}{2}} = 1 + \frac{2m - 2 + n}{4m + 2 + n} \quad \text{Equation feas16}$$

This mole ratio is in the neighborhood of 1.5 for fuels of interest. This means that the pressure of the products at room temperature in the combustion volume is about 1.5 atmospheres. Correspondingly, the pressure during the expansion of the combustion volume is about 1.5 times that of the air combustion process. This is an important difference. This means that 1.5 times the work can be extracted from the same quantity of fuel.

The ratio of gaseous fuel volume to oxidizer volume is also different from the fuel-air process, about 2.5 times the number for fuel-air combustion, as shown in Equation feas 17.

$$\delta_{N2O}(m, n) = \frac{1}{2m + \frac{1}{2}n} \quad \text{Equation feas17}$$

Accordingly, for the given combustion volume the amount of fuel consumed and the amount of energy released is about 2.5 times that for fuel-air combustion.

The required specific fuel ($_{\mu N2O}$), which is the ratio of fuel mass to combustion volume, comes directly from the left side of the chemical reaction, as shown by Equation feas18.

$$\mu_{N2O}(m, n) = \frac{M_{fuel}}{v} \quad \text{Equation feas18}$$

$$= \frac{(12m + n) \text{ gm fuel}}{\left(1 + 2m + \frac{n}{2}\right) \text{ mole gas}} \frac{1 \text{ molegas}}{22.4 \text{ liter}}$$

$$= 9 \times 10^{-5} \left(\frac{12m + n}{2 + 4m + n}\right) \frac{g}{c}$$

The values of Table feas1 for combustion in air are presented in Table feas2 for combustion using nitrous oxide.

TABLE feas2

| Fuel | Propane | Butane | Propyne |
|---|---|---|---|
| Composition | $C_3H_8$ | $C_4H_{10}$ | $C_3H_4$ |
| Reactant-product mole ratio ($\alpha_{N2O}$) | 1.54 | 1.57 | 1.44 |
| Specific fuel volume ($\delta_{N2O}$, cc/cc) | 0.10 | 0.077 | 0.125 |
| Specific fuel mass ($\mu_{N2O}$, mg/cc) | 0.180 | 0.186 | 0.20 |
| Gaseous fuel density ($\rho_g$, mg/cc) | 1.96 | 2.59 | 1.79 |
| Liquid fuel density ($\rho_l$, gm/cc) | 0.585 | 0.573 | 0.571 |

The observed flame temperature for the hydrocarbon-nitrous oxide reaction is difficult to find. However, a reasonable estimate is to place it midway between the hydrocarbon-air reaction and the hydrocarbon-oxygen reaction or at 2500 K. The higher flame temperature will contribute somewhat to greater energy extraction from the fuel due to greater thermodynamic efficiency. The higher flame temperature does significantly complicate the prediction of energy extraction since dissociation of the combustion products is much more severe. Instead, the performance of a fuel-nitrous oxide hopper can be more accurately predicted by observing the 50% increase in post reaction pressure and the 150% increase in fuel density. These two figures predict an increase in performance by a factor of 3.7 over fuel-air combustion. Experiments with fuel-nitrous oxide combustion have shown this number to be reasonably accurate.

Nitrous oxide also releases energy when it dissociates into nitrogen and oxygen during the combustion reaction. Although the energy released per unit weight of nitrous oxide is relatively small, the large amount of nitrous oxide mixed with fuel increases the effective yield of the fuel by 30%. The total energy released during the combustion reaction is 30% higher than the same amount of fuel turned in air.

The use of nitrous oxide can greatly simplify the design and construction of the hopper, as discussed below.

Combustion using nitrous oxide does have one drawback: the increased amount of consumable materials required on-board the hopper. For the propyne-air reaction, a specific fuel volume of about 0.05 is required. For propyne-nitrous oxide this value increases to 0.125. However, this is not the complete story. With fuel-air combustion the remainder of the combustion volume (here 0.95) is filled with ambient air. For fuel-nitrous oxide combustion the remainder of the combustion chamber (0.875) must be filled with nitrous oxide. This means that, on a volumetric basis, 20 times the consumables can be needed to perform a hop than with fuel alone. The energy extracted during a single hop can be about 3.7 times as great so, to cover a given range, the total amount of consumables can be about 5.4 times that of the fuel-air system. This is not completely prohibitive and, in cases where extra hop height is needed but very long range is not important a nitrous oxide based system can be very attractive. One other use for a nitrous oxide system is to produce a hybrid that uses a fuel-air reaction for long-range travel and moderate hop heights but can convert to a fuel-nitrous oxide system to negotiate large obstacles. The specifics of such a design will be discussed later. On-board oxidizers such as nitrous oxide are also attractive for applications in oxygen-poor environments such as space, other planets, and confined spaces.

Challenges of Combustion Powered Linear Actuation

The use of fuel rather than electricity does lead to the significant complications of carburetion, fuel metering, ignition, and exhaust gas purging. This section discusses these complications in detail and explains innovations that overcome them.

The use of a cylinder and piston arrangement and ignition of a fuel-air mixture is similar to a conventional internal combustion engine. However, there are significant and important differences which greatly complicate design and development of the vehicle. Throughout this description, comparisons and contrasts with conventional internal combustion engines are used to explain these differences.

Some major challenges in producing a combustion powered hopping vehicle are those involved in the related areas of cold start capability, misfire tolerance and atmospheric pressure carburetion. For the vehicle to be completely autonomous, it must have the ability to begin hopping without external intervention. This is termed cold start capability. For conventional internal combustion engines a starting system consisting of a starter motor and battery usually provides this function. During short intervals where power is not required from the engine it simply idles: runs at low speed consuming little fuel and doing no useful work. In the case of a hopping robot, however, there is no state comparable to idling of an internal combustion engine, so every hop can be viewed as a cold start. The use of significant electrical energy to provide a cold start capability can require significant battery resources, detracting from the advantages of combustion-powered mobility.

Closely related to cold start and potentially more limiting is misfire tolerance. A misfire is a condition where the fuel-air mixture fails to ignite when the ignition system fires. After a misfire, the combustion chamber must be purged to remove the fuel-air mixture, new fuel and air must be introduced, and the ignition system must fire again. If a conventional internal combustion engine misfires, the engine can coast through the misfire and onto the next power stroke performing all the necessary functions to tolerate the misfire. An efficient hopping robot need not have any continuously moving mechanical parts, so a misfire must be tolerated by using other forms of energy. If misfires are significantly less frequent than cold starts, the expenditure of small amounts electrical energy can be acceptable. However, it is preferable if the system does not require additional energy to tolerate a misfire.

A third major challenge is atmospheric pressure carburetion. Carburetion consists of combining fuel and air and introducing them into the combustion chamber. Introducing fuel into the chamber is relatively straightforward since fuel volume is small compared to the combustion chamber volume and the fuel system can easily be pressurized. Introducing air into the combustion chamber is another matter. Conventional four-stroke internal combustion engines draw air into the cylinder by means of the vacuum generated during the intake stroke. Conventional two-stroke internal combustion engines draw air into the crankcase under vacuum and then discharge it to the cylinder under pressure. Open flame combustion devices such as propane torches and pressure lanterns use an accelerated fuel stream to produce a Bernoulli effect to entrain the required air. If a hopping robot is normally in a cold start mode and must be able to hop after extended dormant periods, then maintaining the combustion chamber under vacuum can be problematic. The use of an entrainment system also presents problems because the fuel-air mixture must be introduced into a closed combustion volume. Entrainment carburetion only works for an open flame where the downstream pressure is never above atmospheric.

In addition to the above challenges, igniting the fuel-air mixture can be considerably more difficult than in a conventional internal combustion engine. First, the lack of a compression stroke means that the uncompressed fuel-air mixture must be ignited. Conventional internal combustion engines typically use compression ratios of 8:1. This means that the volumetric energy density of the fuel-air mixture in an atmospheric pressure combustion chamber is only ⅛ as great as that of a conventional internal combustion engine. Also, in a conventional internal combustion engine the adiabatic compression of the fuel-air mixture raises the temperature by about 400 C. The combination of lower energy density and lower temperature in an atmospheric pressure combustion-powered actuator can make ignition much more difficult. One difficulty is that the combustion chamber for the hopper must be more completely purged then for an internal combustion engine. Conventional four-stroke engines leave about 15% of the volume unpurged. Conventional two-stroke engines leave about a 40% unpurged. Experiments with atmospheric pressure combustion show that less than 5% of the combustion chamber volume can be left unpurged for ignition to be practically achieved.

Using an on-board oxidizer such as nitrous oxide can reduce some of these challenges. Carburetion can be simpler because oxidizer under pressure can be injected into the combustion chamber. Similarly, misfire tolerance can be much easier to achieve since the injection of fuel and oxidizer can be used to purge the combustion volume. Another application for the onboard oxidizer is planetary exploration missions. In atmospheres such as that of Mars no substantial oxygen is present and it must be carried in the form of the oxidizer. Oxidizer mass is at least several times the mass of the fuel and does therefore limit the range. In the case of Mars exploration, the reduced gravity increases the range so that the total range is about 50 percent of an earthbound hopper without oxidizer. Even this reduced range represents a significant improvement over most other technologies for planetary exploration in terms of overall range and mobility.

Combustion Powered Linear Actuators

Figure 11:
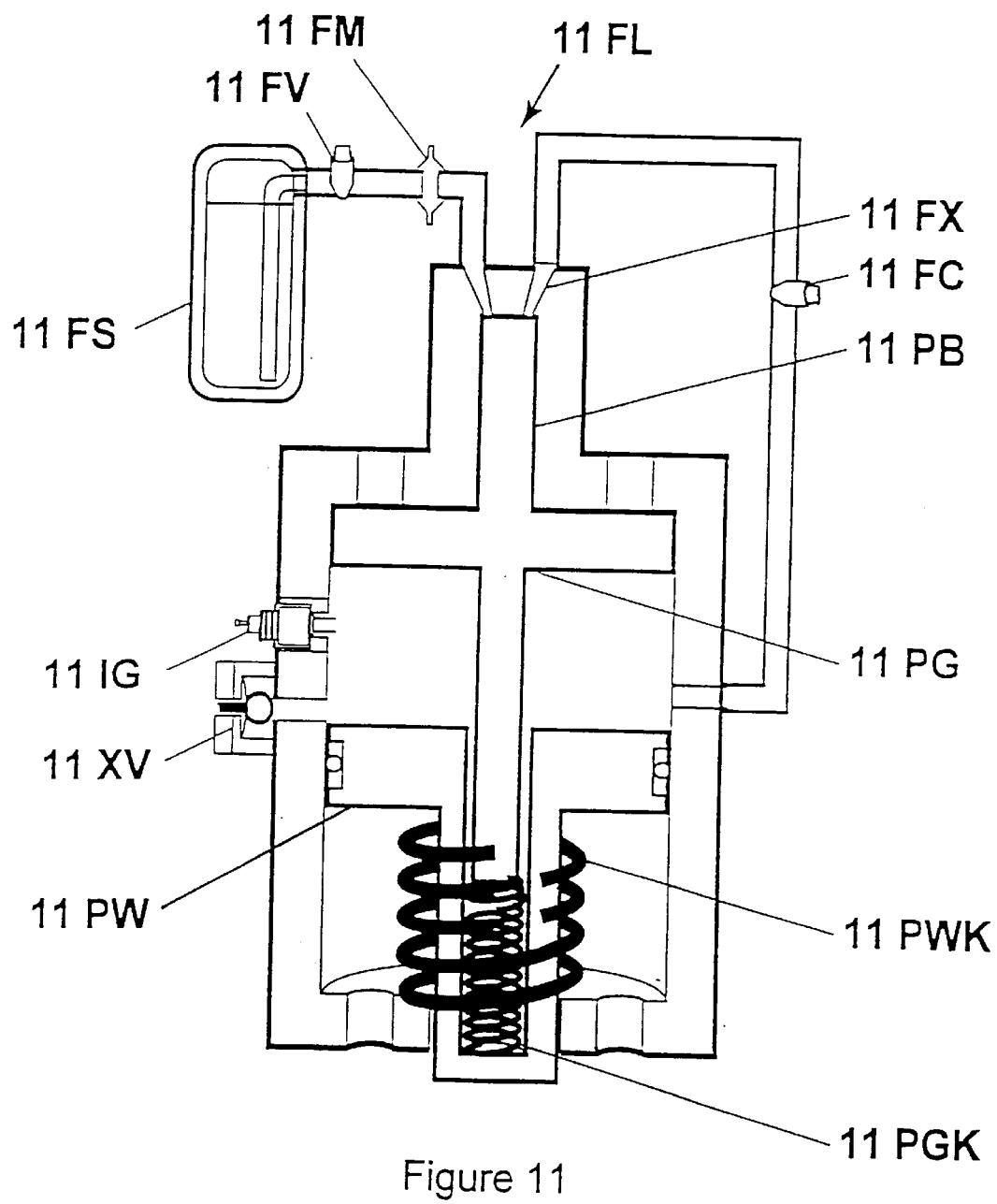
FIG. 11 is a schematic representation of a combustion-powered actuator.

An actuator that meets the challenges is shown schematically in FIG. 11. The same actuator is reproduced as FIGS. 12($a,b,c,d,e,f$), with the actuator shown during six different phases of the operating cycle. A power piston 11 PW and a purge piston 11 PG mount with a body 11B and are movable along an axis thereof. Power piston 11PW, purge piston 11PG, and body 11B define a combustion chamber 11CX. A power piston return spring 11PWK mounts with body 11B and with power piston 11PW, exerting force on power piston 11PW along axis 11X. A purge piston return spring 11PGK mounts with body 11B and with purge piston 11PG, exerting force on purge piston 11PG along axis 11X. A secondary piston 11PB mounts with body 11B, moveable along axis 11X and in mechanical communication with purge piston 11PG. An ignition source 11IG mounts with body 11B, adapted to induce combustion in combustion chamber 11CX. An exhaust port 11XV or valve mounts with body 11B and is in fluid communication with combustion chamber 11CX and is adapted to allow products of combustion therein to exit therefrom. A fuel system 11FL mounts with body 11B, and comprises a fuel storage system 11FS in fluid communication with a fuel expansion chamber 11FX via a fuel control valve 11FV and fuel meter 11FM. Fluid expansion chamber 11FX is in fluid communication with combustion chamber 11CX via fuel charging valve 11FC.

Figure 12A:
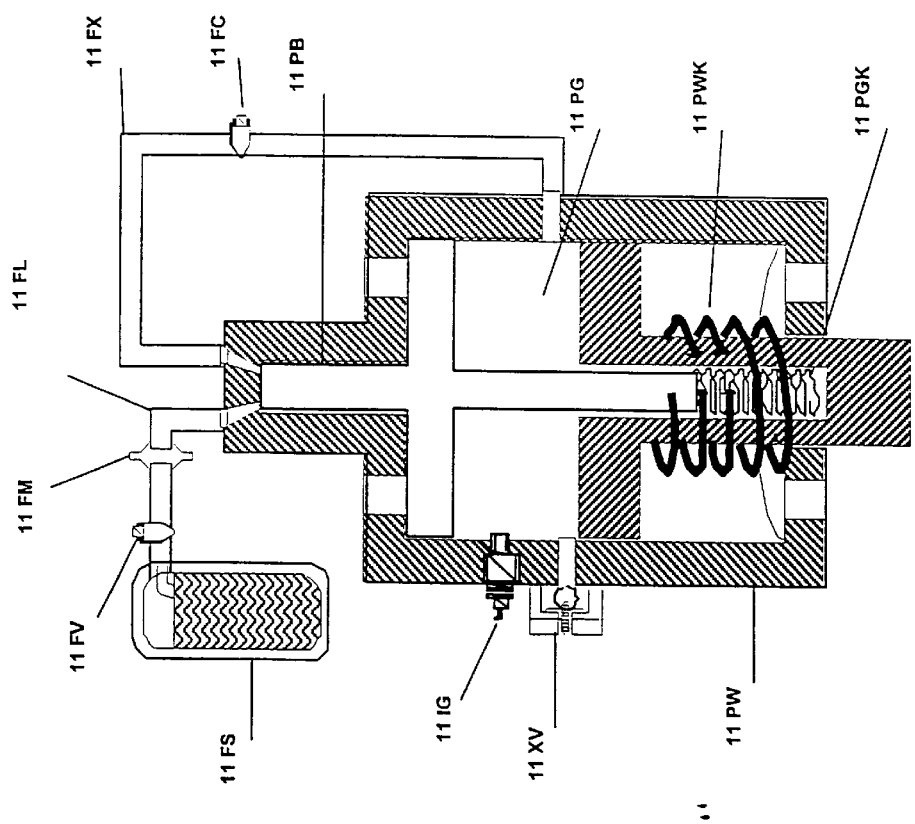
FIGS. 12(a,b,c,d,e,f) are schematic representations of combustion-powered actuator during six different phases of the operating cycle.

FIG. 12a shows the actuator in the dormant position. This is the rest position of the actuator and the valves 11FV and pistons 11PW, 11PG, 11PB. In this configuration the power piston 11PW is at the top of its stroke. The purge piston 11PG is also in the highest position. Both pistons 11PW, 11PG can be maintained in this position by means of springs 11PWK, 11PGK. The volume between the two pistons 11PW, 11PG is the combustion volume. Both the fuel valve 11FV and the charging valve 11FC are closed.

Figure 12B:
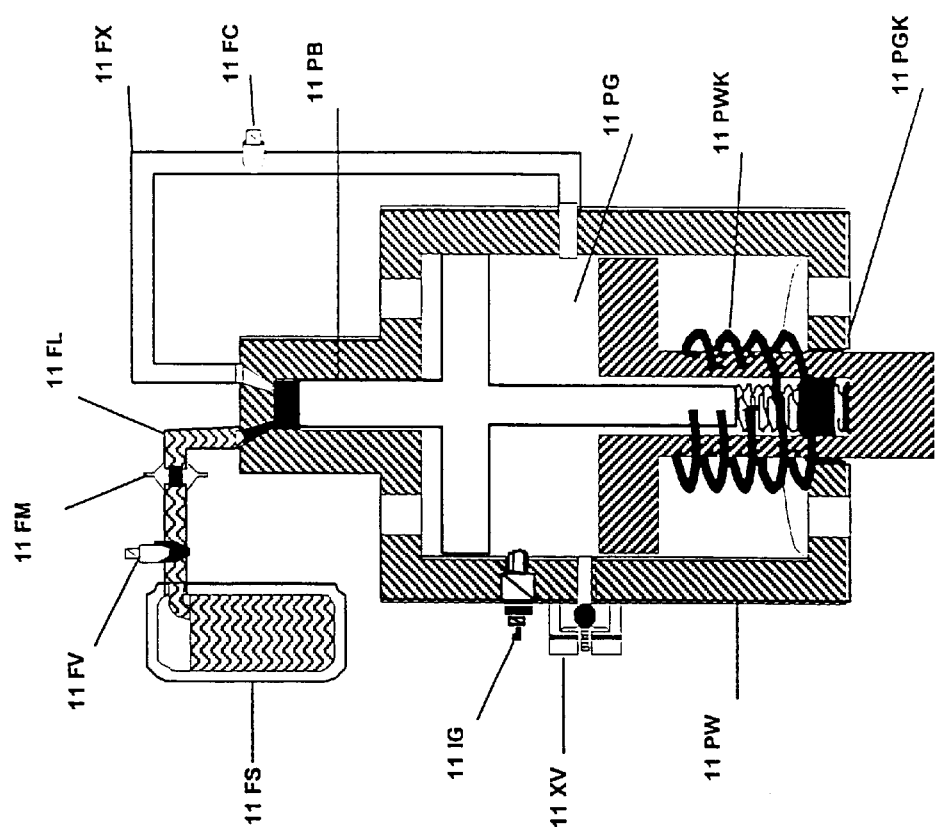

FIG. 12b shows the purging operation. To begin the purge, the fuel control valve 11FV can be opened and fuel metered into the fuel expansion, or secondary, cylinder 11FX. The fuel used here can be any fuel that has a critical temperature higher than ambient temperature. This property means that the fuel can be liquefied under pressure and expands to a gas when the pressure is reduced. Acceptable fuels include propane, butane and methyl acetylene. The fuel leaves the fuel tank 11FS as a saturated vapor and, after metering, high-pressure fuel vapor is delivered to the secondary cylinder 11FX. The specifics of how the fuel system performs this will be discussed later. The expanding fuel drives the secondary piston 11PB and the attached purge piston 11PG downward pushing the combustion products out of the chamber 11CX through an exhaust port 11XV (e.g., an opening in the cylinder or a valve-controlled port in the cylinder).

Figure 12C:
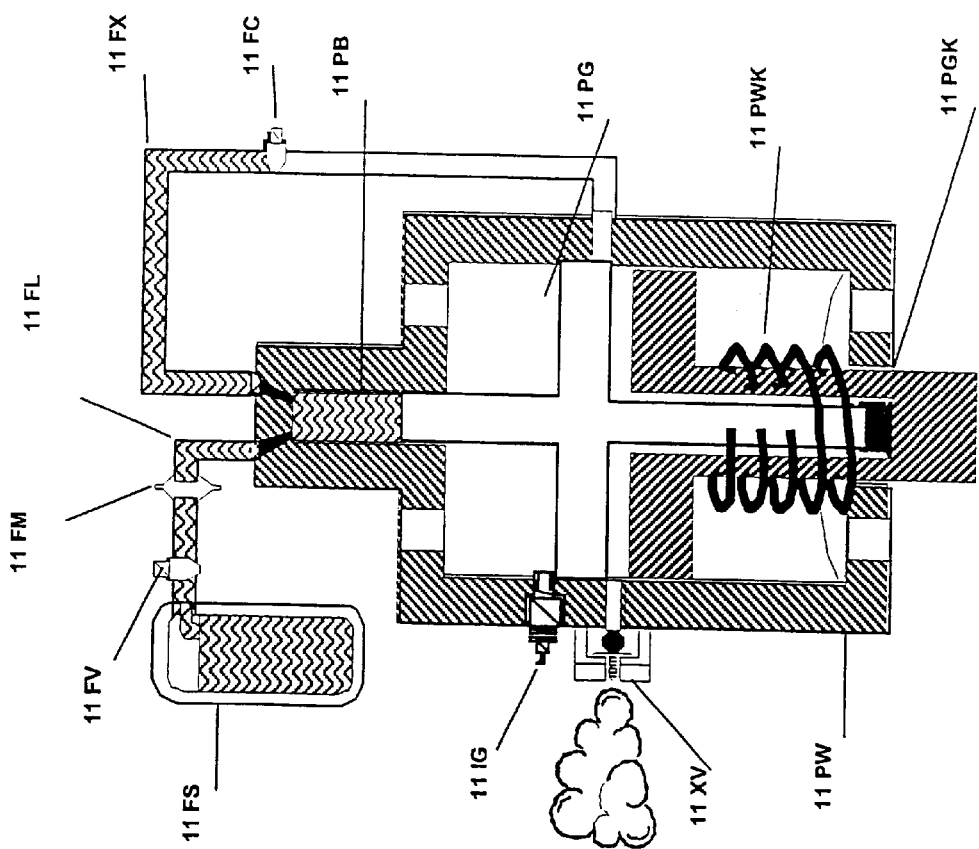

FIG. 12c shows the fully purged position. Both fuel valves 11FV, 11FC are now closed and the proper charger fuel for combustion resides in the secondary cylinder 11FX. The purge piston 11PG is in contact with the power piston 11PG so that virtually all combustion products have been exhausted from the chamber 11CX.

Figure 12D:
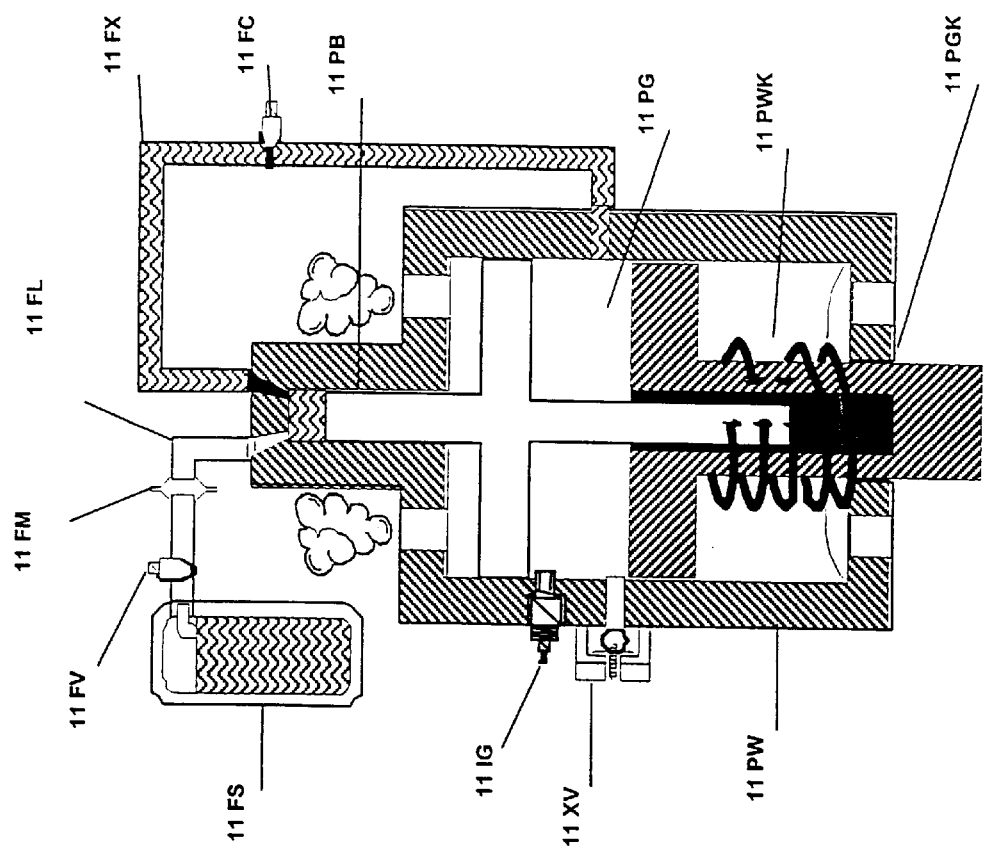

FIG. 12d shows the charging operation. The fuel control valve 11FV remains closed and the fuel charge valve 11FC is open. The purge piston return spring 11PGK forces the purge piston 11PG and secondary pistons 11PB upward and pushes the fuel charge from the secondary cylinder 11FX through the fuel charge valve 11FC into the combustion chamber 11CX. As the purge piston 11PG moves up, fresh air is drawn in through the exhaust port 11XV to the combustion chamber 11CX. When the secondary cylinder 11FX completes venting the purge piston 11PG is returned to the full up position and the combustion chamber 11CX is charged with air and the proper amount of fuel.

FIG. 12e shows the actuator firing. The fuel-air mixture is ignited by means of the ignition source 11IG (e.g., a spark plug) at the side of the combustion chamber. Until this time an exhaust valve 11XV can allow flow in either direction to exhaust combustion products and allow fresh air into the chamber. The exhaust valve 11XV can be a slam check valve that allows low pressure flow in either direction but closes the exhaust when the pressure in the combustion chamber rises rapidly. This can be accomplished by building a check valve with a reverse spring loading. Unlike an ordinary check valve where the spring holds the valve shut and pressure opens the valve, this spring keeps the valve open and pressure shuts the valve. The slam check valve only closes during the power stroke where the combustion causes pressure across the valve to rise because of the relatively small flow capacity of the valve. This simple innovation allows a passive device to normally allow flow in both directions but to seal the chamber during the power stroke. This can be important for applications where electrical actuation of a higher flow rate valve can be undesirable.

Figure 12F:
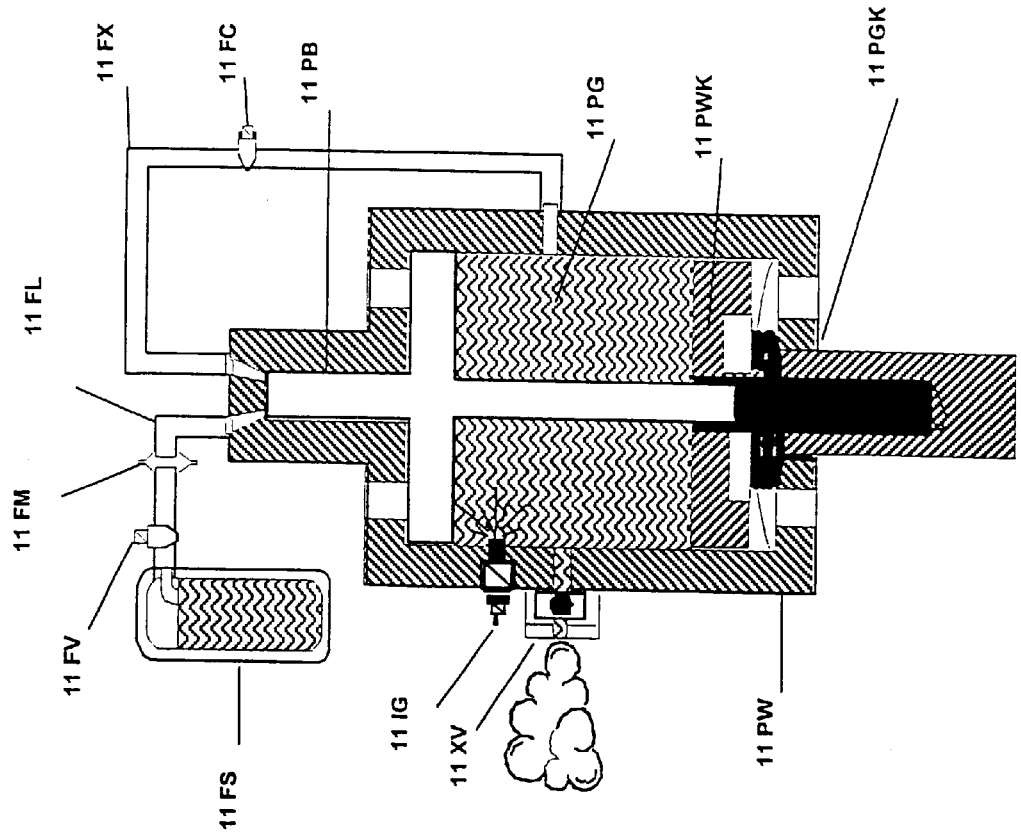

FIG. 12f shows the end of the power stroke. At this point the expansion of the combustion products has pushed the power piston 11PW downward and caused external actuation. This expansion reduces the pressure and cools the gas. In addition, cooling by heat lost from the combustion products reduces the temperature further providing additional pressure reduction. At this point the pressure is low enough that the slam check valve opens and vents what little pressure remains in the combustion chamber 11CX. The power piston return spring 11PWK can return the power piston 11PW to the upper position exhausting some of the combustion products. Once the power piston 11PW reaches the top the system is in the dormant state ready for another cycle.

The problems of cold start and misfire tolerance are solved by using the secondary piston 11PB and purge piston 11PG. Using the energy available in the expanding fuel vapor, the combustion volume can be properly purged without the need for additional energy. In event of a misfire, the power stroke does not occur and the cycle of operation automatically moves to the dormant position, repurges the combustion chamber, and introduces fresh fuel and air. In this way, no sensor is required to indicate whether misfire has occurred since the operation after misfire is identical to normal operation. Also, no extra energy is used in the event of misfire, so the actuator can tolerate any number of misfires.

The purge piston 11PG also addresses the problem of atmospheric pressure carburetion. The purge piston 11PG provides a positive way to remove combustion products from the combustion chamber 11CX and draw fresh air into the chamber on its return stroke. The fuel system 11FL is pressurized so introduction of the fuel into the combustion chamber 11CX is accomplished simply by means of valves 11FV, 11FC.

Figure 13:
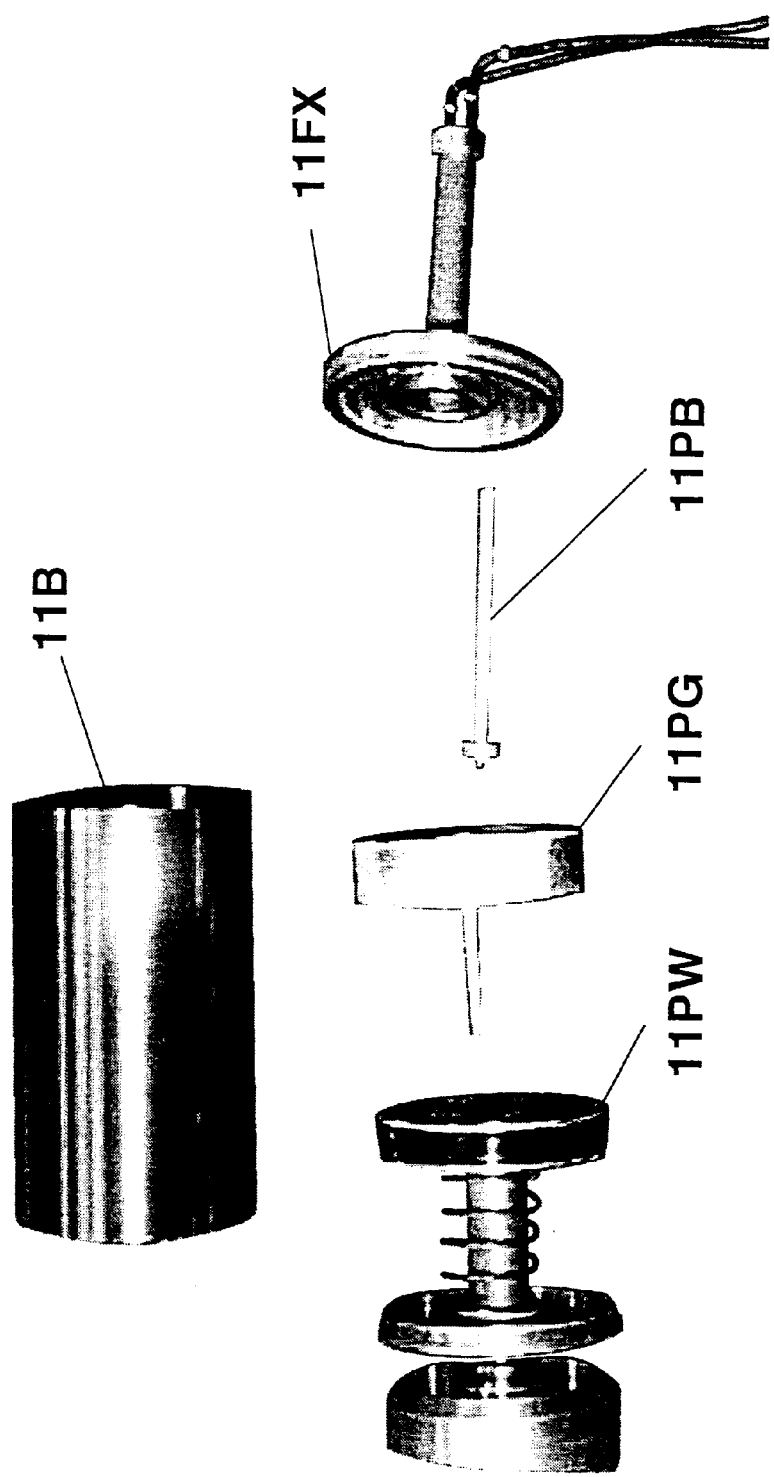
FIG. 13 is an illustration of a combustion-powered actuator.

This complete actuator described above has been built and successfully tested. The complete assembly as well as the individual parts are shown in FIG. 13.

Figure 14:
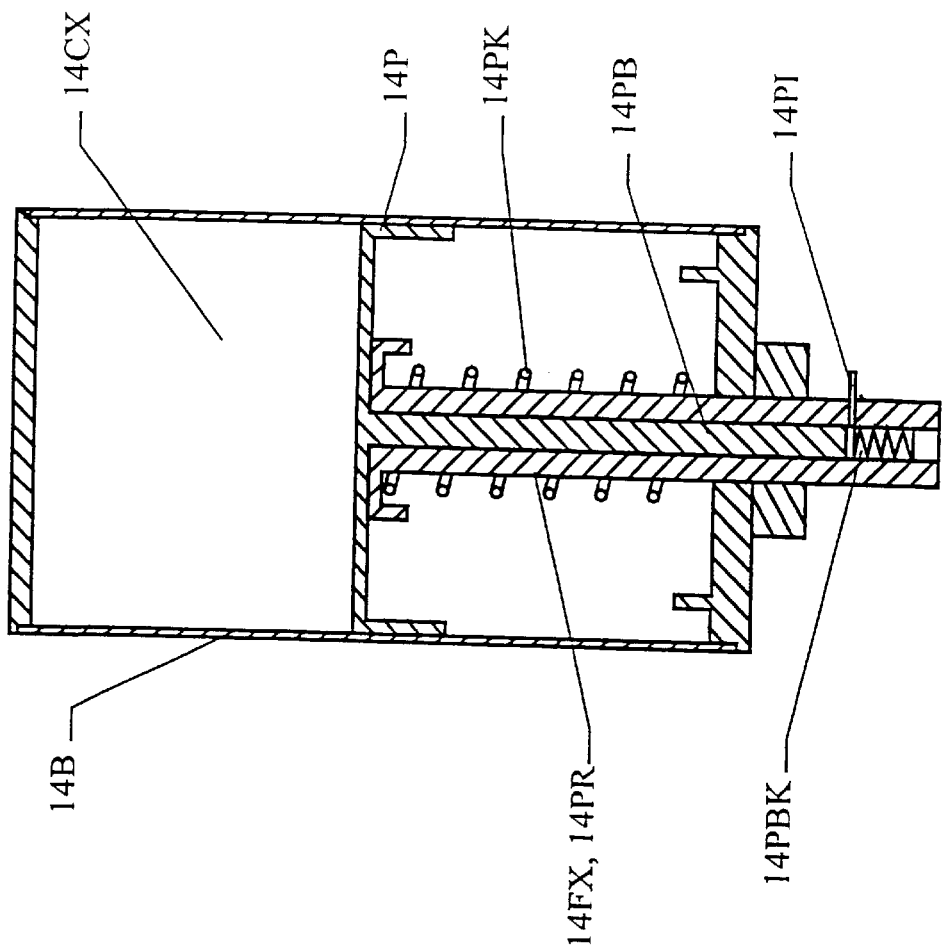
FIG. 14 is a sectional view of a combustion-powered actuator.

Another embodiment of a misfire tolerant actuator is shown in section in FIG. 14. Compared with the previously discussed actuator, the purge piston 11PG and power piston 11PW have been combined into a single element 14P in the actuator of FIG. 14 and the secondary piston 14PB and cylinder 14FX have been placed inside the power piston rod 14PR. This can reduce the overall height of the actuator by eliminating the protruding secondary cylinder and by removing the height of the purge piston as compared with the system of FIG. 11.

The operation of actuator in FIG. 14 is similar to that previously described. The purge piston and the power piston are the same unit, however. Fuel is initially introduced at the fuel input 14FI just below body 14B. The fuel pressure moves the secondary piston 14PB which pushes the power piston 14P through the combustion chamber 14CX, purging the combustion products therefrom. When the fuel is vented from the secondary cylinder 14FX into the combustion chamber 14CX, the power piston 14P returns to the original state and air is drawn into the combustion chamber 14CX by this motion.

The actuator of FIG. 14 has advantages over the previously discussed actuator. The smaller size can allow for greater specific power. The simpler combustion chamber design can provide for more efficient purge of the combustion products. Tension return spring 14PBK for the secondary piston 14PB can eliminate the need for a rod and spring in the combustion chamber. The actuator of FIG. 14 has at least one possible drawback: the position of the fuel inlet. Because the secondary cylinder is combined with the power piston rod, the fuel inlet 14FI moves as the power piston 14P moves. This can require a flexible connection from a fuel control valve to the fuel inlet 14FI.

Fuel System Design

The amount of fuel used during a charge can be quite small, e.g., about 1 mg for a 15 cc combustion chamber volume. In liquid form this is about two microliters. In propane powered internal combustion engines, the fuel is normally withdrawn from the tank as a liquid and is not converted to vapor until the point of carburetion. The very small quantities of fuel needed and the requirement to use the expansion work of the fuel vapor makes extracting fuel from the tank in the vapor state attractive for a combustion powered linear actuator.

The fuel vapor can be extracted by positioning a tank outlet in the upper part of the tank. The fuel removed this way is a saturated vapor and is therefore prone to condensation. The pressure in the fuel tank is determined by the vapor pressure of the fuel at ambient temperature. Fuels such as butane, propane, and propyne have vapor pressures of up to 100 psi. A fuel control valve is needed to handle the very small fuel quantities at relatively high pressures. The fuel control valve preferably requires minimal operating power so that many actuations can be performed on a single battery. A new low-power, high-pressure small solenoid valve, based on technology developed for miniature electromagnetic relays, can be used.

Fuel Control Valves

A miniature electrically operated valve that can stand off high pressures, that can be inexpensively produced, and that can be made to operate without continuous electrical power can be used with the present invention. The valve comprises a housing and a beam mounted with the housing having a seat mounted therewith. An electromagnetic energy source, such as an electromagnetic coil, mounts with the housing and when energized urges the beam in one direction. The beam can be urged in the opposing direction by reversing the polarity of the electromagnetic energy source, by a passive mechanism such as gravity or a spring, or by a second electromagnetic energy source. Two fluid ports mount with the housing. A first fluid port mounts so that, as the beam is urged in one direction or the opposite, the seat moves between engaging and substantially sealing the fluid port and disengaging and not substantially sealing the fluid port. Latching mechanisms such as permanent magnets can be mounted with the valve so that the valve remains in the open or closed positions without continuous electrical power input. Fluid thus can flow through the housing between the two fluid ports when the seat does not seal the first fluid port, but can be prevented from flowing by urging the beam so that the seat seals the first fluid port.

VALVE EMBODIMENT

Figure 16:
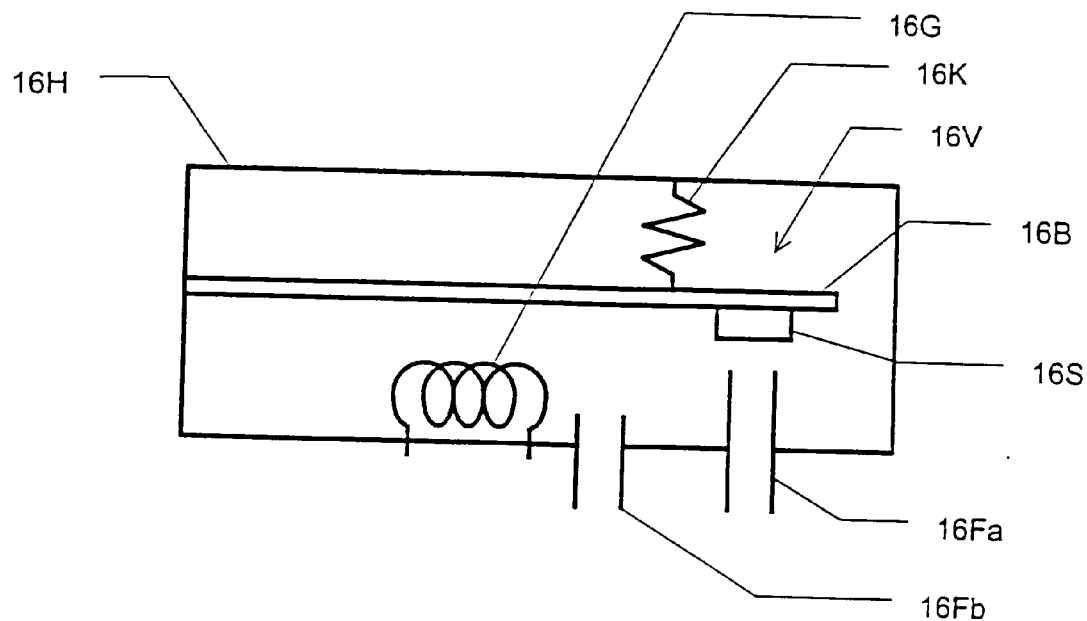
FIG. 16 is a schematic view of a miniature electromagnetic valve.

FIG. 16 is a schematic view of a valve according to the present invention. Housing 16H encloses a volume 16V. Beam 16B mounts with housing 16H, as does electromagnetic force generator 16G. First 16Fa and second 16Fb fluid ports mount with housing 16H and are in fluid communication with volume 16V. Seat 16S mounts with beam 16B. Beam 16B is mounted with housing 16H so that the portion with seat 16S is moveable between first and second positions: when in the first position seat 16S does not seal either fluid port, and when in the second position seat 16S seals first fluid port 16Fa. Electromagnetic force generator 16G urges beam 16B to the second position when electrical energy is applied to electromagnetic force generator 16G. For example, beam 16B can be an armature associated with an electromagnetic force generator comprising an electromagnet or coil. Alternate energization of electromagnetic force generator 16G can urge beam 16B to the first position, or the mounting of beam 16B with housing 16H can supply passive urging of beam 16B to the first position. For example, fluid pressure in first fluid port 16Fa, gravity, a permanent magnet, or a spring 16K can passively urge the beam 16B to the first position. If fluid flow is into volume 16V through second fluid port 16Fb and out through first fluid port 16Fa, then fluid pressure can help urge seat 16S against first fluid port 16Fa and thereby allow the valve to standoff greater pressures. Suitable dimensions, materials, and operating characteristics are discussed below.

VALVE EMBODIMENT

Figure 17:
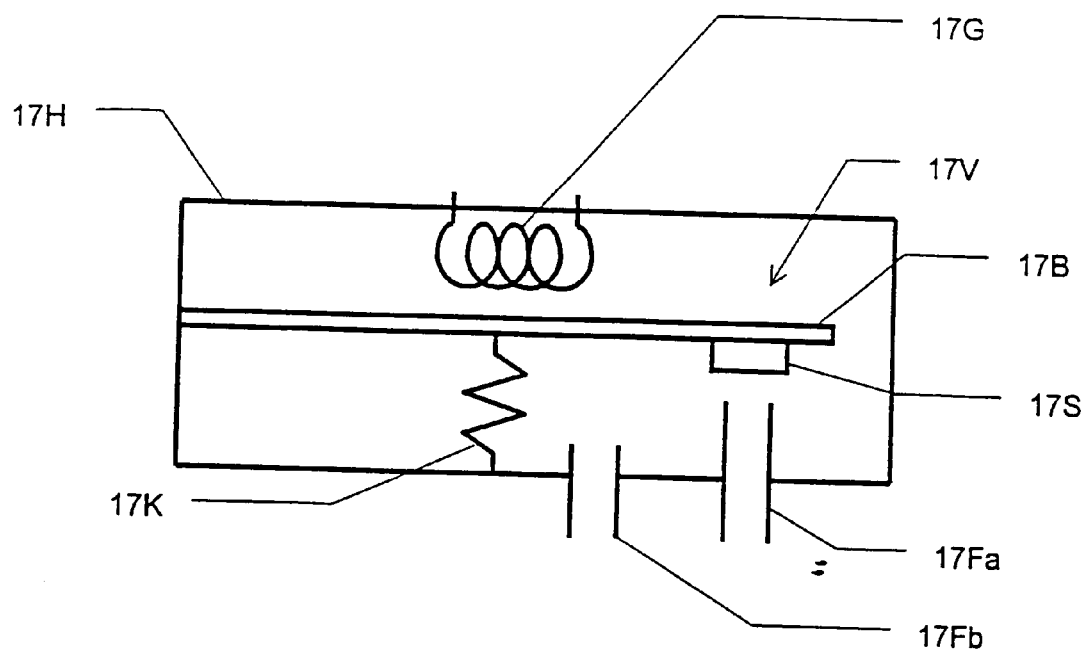
FIG. 17 is a schematic view of a miniature electromagnetic valve.

FIG. 17 is a schematic view of a valve according to the present invention. Housing 17H2 encloses a volume 17V. Beam 17B mounts with housing 17H, as does electromagnetic force generator 17G. First 17Fa and second 17Fb fluid ports mount with housing 17H and are in fluid communication with volume 17V. Seat 17S mounts with beam 17B. Beam 17B is mounted with housing so that the portion with seat 17S is moveable between first and second positions: when in the first position seat 17S does not seal either fluid port, and when in the second position seat 17S seals first fluid port 17Fa. Electromagnetic force generator 17G urges beam 17B to the first position when electrical energy is applied to electromagnetic force generator 17G. For example, beam 17B can be an armature associated with an electromagnetic force generator comprising an electromagnet or coil. Alternate energization of electromagnetic force generator 17G can urge beam 17B to the second position, or the mounting of beam 17B with housing 17H can supply passive urging of beam 17B to the second position. For example, gravity, a permanent magnet, or a spring 17K can passively urge the beam to the second position. If fluid flow is into volume 17V through second fluid port 17Fb and out through first fluid port 17Fa, then fluid pressure can help urge seat 17S against first fluid port 17Fa and thereby allow the valve to standoff greater pressures. Suitable dimensions, materials, and operating characteristics are discussed below.

VALVE EMBODIMENT

Figure 18:
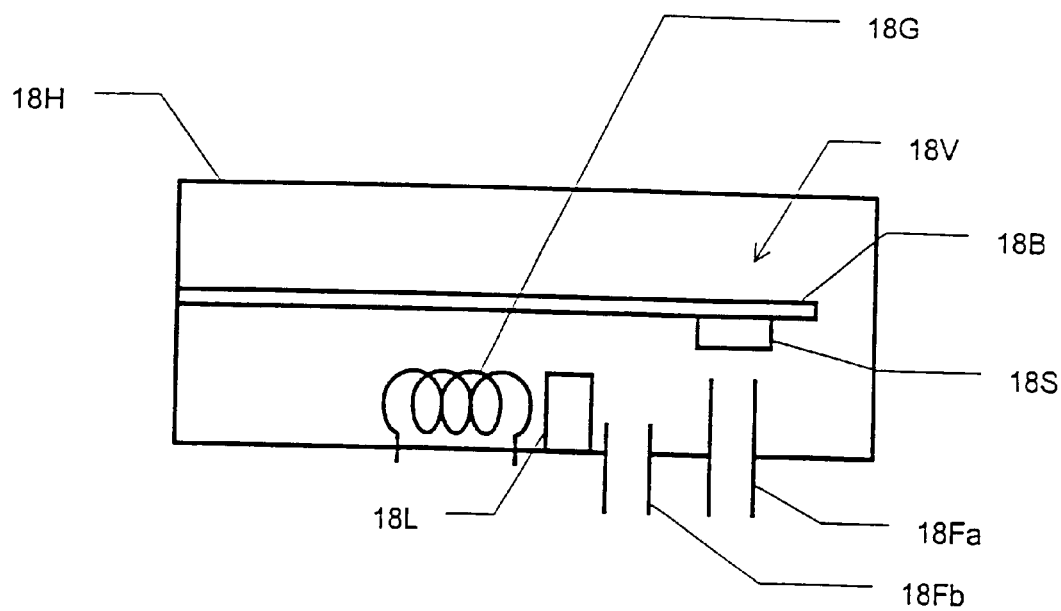
FIG. 18 is a schematic view of a miniature electromagnetic valve.

FIG. 18 is a schematic view of a valve according to the present invention. The valve shown in FIG. 18 is similar to that in FIG. 16, with the addition of a latching mechanism 18L mounted with housing 18H. In operation, electromagnetic force generator 18G urges beam 18B toward first fluid port 18Fa. Latch 18L exerts force on beam 18B sufficient to maintain beam 18B in the first position, sealing first fluid port 18Fa, once beam 18B is sufficiently close to the first position. For example, a permanent magnet can be mounted with housing 18H so that the associated magnetic force on beam 18B is strong enough to overcome any passive urging of beam 18B away from the first position when beam 18B is in the first position. Once beam 18B is away from the first position, then the increased distance from the permanent magnet can result in the associated magnetic force being insufficient to overcome the passive urging away from the first position. Unless the valve is to be closed once for all time, active urging of beam 18B, overcoming latching mechanism 18L, is needed. Such active urging can be supplied, for example, by alternate energization of electromagnetic force generator 18G. The operation of latching mechanism 18L allows the valve to remain in a closed state without additional energy input, an important consideration when available power is limited or when power is not continuously available.

VALVE EMBODIMENT

Figure 19:
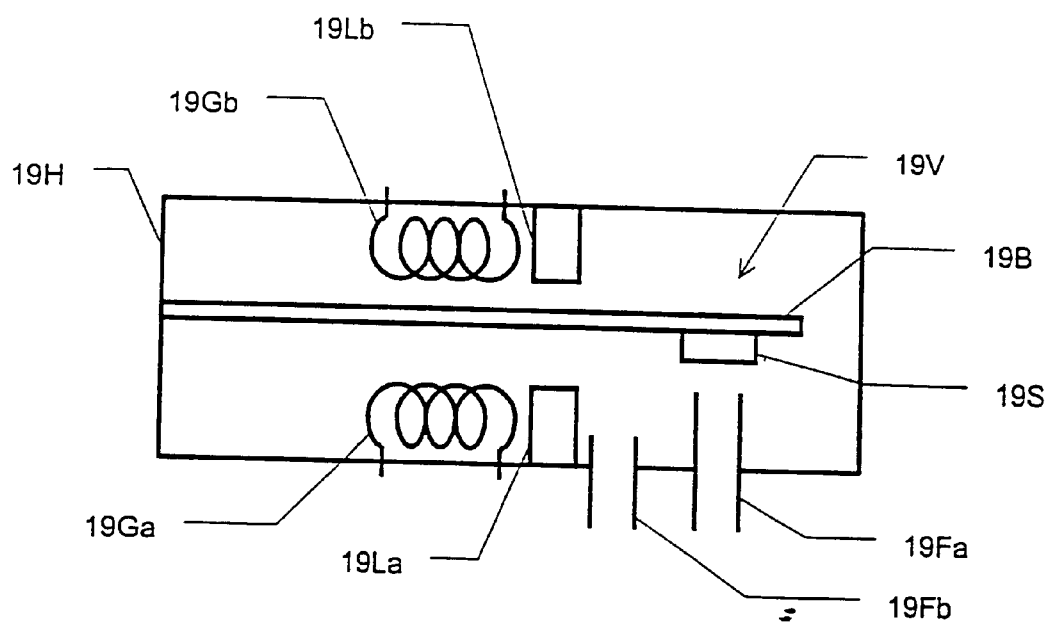
FIG. 19 is a schematic view of a miniature electromagnetic valve.

FIG. 19 is a schematic view of a valve according to the present invention. The valve shown in FIG. 19 is similar to that in FIG. 18, with the addition of a second latching mechanism 19Lb and second electromagnetic force generator 19Gb mounted with housing 19H. In operation, first electromagnetic force generator 19Ga urges beam 19B toward first fluid port 19Fa. Latch 19La exerts force on beam 19B sufficient to maintain beam 19B in the first position, sealing first fluid port 19Fa, once beam 19B is sufficiently close to the first position. For example, a permanent magnet can be mounted with housing 19H so that the associated magnetic force on beam 19B is strong enough to overcome any passive urging of beam 19B away from the first position when beam 19B is in the first position. Once beam 19B is away from the first position, then the increased distance from the permanent magnet can result in the associated magnetic force being insufficient to overcome the passive urging away from the first position. Second electromagnetic force generator 19Gb can urge beam 19B away from the first position and to the second position. Latch 19Lb exerts force on beam 19B sufficient to maintain beam 19B in the second position, exposing and allowing fluid flow through first fluid port 19Fa, once beam 19B is sufficiently close to the second position. For example, a permanent magnet can be mounted with housing 19H so that the associated magnetic force on beam 19B is strong enough to overcome any passive urging of beam 19B away from the second position when beam 19B is in the second position. Once beam 19B is away from the second position, then the increased distance from the permanent magnet can result in the associated magnetic force being insufficient to overcome the passive urging away from the first position. The operation of latching mechanisms 19La, 19Lb allows the valve to remain in either open or closed state without additional energy input, an important consideration when available power is limited or when power is not continuously available.

OTHER EMBODIMENTS

Figure 20:
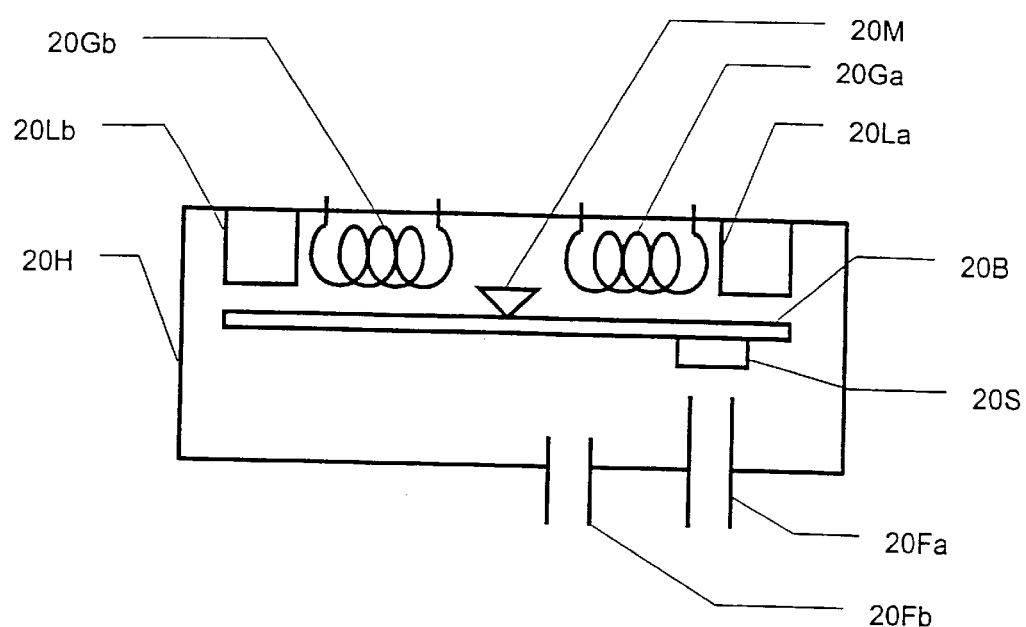
FIG. 20 is a schematic view of a miniature electromagnetic valves.

FIG. 20 is a schematic diagram of another miniature valve. Beam 20B mounts within housing 20H, pivoting about or flexing in relation to fulcrum 20M. Seat 20S mounts with beam 20B. First 20Ga and second 20Gb coils mount with housing 20H. First 20Fa and second 20Fb fluid ports mount with housing 20H, with first fluid port 20Fa aligned with seat 20S so that seat 20S can sealingly engage first fluid port 20Fa. In operation, first coil 20Ga pulls beam 20B in a counterclockwise direction; second coil 20Gb pulls beam 20B in a clockwise direction. Latching mechanisms 20La, 20Lb hold beam 20B so that beam 20B either seals first fluid port 20Fa or leaves first fluid port 20Fa open once coils 20Ga, 20Gb have pulled beam 20B in the corresponding direction. Latching mechanisms 20La, 20Lb can be, for example, permanent magnets mounted with housing 20H. A third fluid port (not shown) can be added, corresponding to a second seat (not shown) mounted opposite the fulcrum 20M from the first seat 20S, allowing fluid to be routed by the valve to either the first fluid port 20Fa or the third fluid port (not shown).

EXAMPLE IMPLEMENTATION

A miniature valve can be made with a miniature short-throw solenoid with a spring or other mechanism to return the armature to an initial position. The solenoid can be housed in any suitable sealed housing that allows inlet and outlet ports to be attached. An elastomeric valve seat can be attached anywhere along the armature of the solenoid so that it makes contact and seals one of the fluid ports in one of the armature's positions. Cantilever and axial solenoids are both suitable. A latching capability can be added by mounting a permanent magnet so that it provides sufficient force on the armature to retain the armature in one of its stable positions.

The size of the fluid outlet port is related to the force exerted by the solenoid: the force provided by the solenoid must be sufficient to open the valve against the maximum fluid pressure. The force required is the maximum fluid pressure multiplied by the total cross-sectional area of the outlet port (measured to the outside diameter of the outlet port tube). This constraint relates the maximum standoff pressure, the fluid port outside diameter, and the strength of the solenoid.

Small scale solenoids generally exert relatively low force, and the force exerted reduces rapidly as the armature moves away from the coil. Accordingly, the position of the fluid port relative to the elastomerix valve seat can be important. A fine thread screw adjustment or a sliding press fit can aid in precisely positioning the fluid port. A smooth surface on the outlet port can help achieve a good seal between the elastomeric seal and the fluid port.

METHOD OF MAKING A VALVE FROM A STANDARD MINIATURE RELAY

Figure 21A:
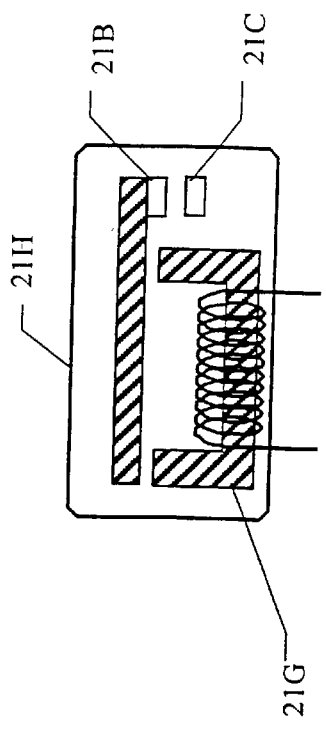
FIGS. 21(*a,b*) are schematic views of a conventional electromagnetic relay modified to produce a miniature electromagnetic valve.
Figure 21B:
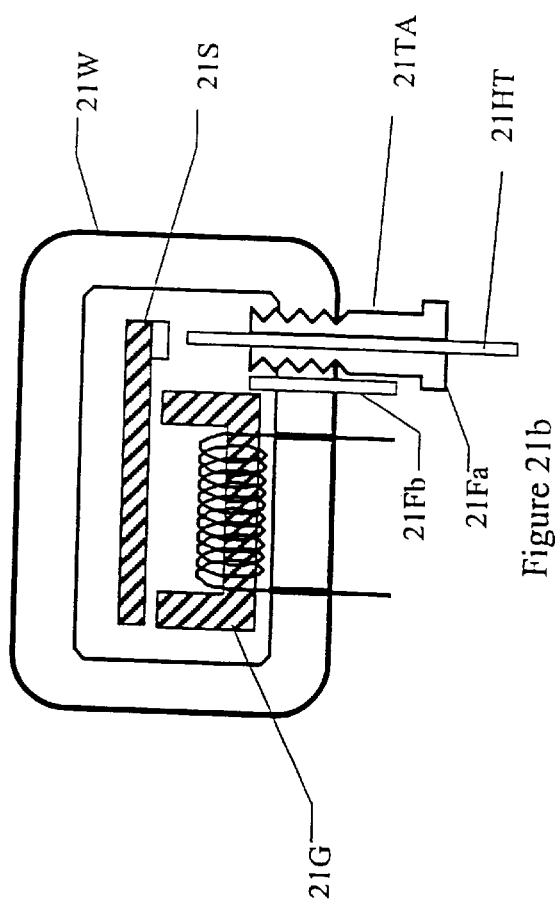

A valve according to the present invention can be made starting with technology developed for miniature electromagnetic relays. FIG. 21a shows a schematic of a conventional miniature electro-mechanical relay. It comprises an electromagnet 21G that moves a flexible reed 21B which contains one side of the electrical contact. The other side of the contact is rigidly attached to case package 21H. Direct modification of such an electromechanical relay can yield a valve. FIG. 21b schematically illustrates the modification. In FIG. 21b the movable contact has been replaced with an elastomeric valve disk 21S, and the stationary side of the contact has been replaced with a fluid port 21Fa comprising a hypodermic needle 21HT having an adjustable position. The hypodermic needle 21HT can be sized such that the amount of force produced by the electromagnet 21G is sufficient to lift the seat 21S at full operating pressure. For example, with a relay that exerts ¼ ounce of force, a hypodermic needle 21HT with an outside diameter of 0.010" allows the valve to lift at pressures of up to 200 psi. The inlet line 21Fb to the valve can be a small tube inserted through the relay casing 21H. If the valve body 21H is always under pressure, the entire system can be encased in a rigid housing to provide mechanical integrity. The screw adjustment 21TA of the hypodermic needle can aid in obtaining correct operation because of the very short throw of the electromechanical relay: the valve seat position can be adjusted by turning the screw until proper operation is achieved.

Fuel System Control

The valve system can use a microprocessor to open the valve for the correct amount of time. The accurate metering of the fuel as a function of time can be accomplished by a small orifice plate. The orifice diameter can range from 10–50 microns, for example, depending on the desired fuel metering rate. The low downstream pressure produces choked flow at the exit of the orifice providing precise metering regardless of the fluctuations in downstream pressure caused by operation of the secondary piston.

Passing through the metering orifice reduces the fuel pressure so that the fuel vapor is no longer saturated. Upstream of the orifice plate the fuel is a saturated vapor. This can lead to some difficulties caused by condensation of the vapor. Experiments have shown that when the fuel metering valve is in the closed position, the saturated vapor condenses in the valve body eventually filling the entire body with liquid. To handle condensation in the valve body, the valve can be mounted in the upper portion of the fuel tank and a portion of the valve body can be removed to allow the condensate to drain back into the tank. The condensation in the orifice can be treated by placing a small amount of porous material upstream of the orifice plate. This is the normal solution to this problem. In equipment such as propane torches the orifice plate is frequently integral with a sintered bronze filter upstream of the orifice.

The final fuel system can consist of a refillable fuel tank with an integral latching two-way solenoid valve in the top of the tank, a metering orifice to control the fuel flow rate, and a second latching two-way valve to transfer the fuel from the secondary cylinder to the combustion chamber.

Ignition System

Ignition of the fuel-air mixture can be achieved using a high voltage spark across the gap of a spark plug. The basics of this type of ignition are similar to that of a conventional internal combustion engine. However, because the combustion-powered linear actuator has much lower energy density and must ignite at ambient temperatures, ignition can be significantly more difficult. Tests have shown that about 50 kV across a 0.20 inch gap can be suitable. This is about twice the voltage and five times the spark gap of a conventional internal combustion engine. Tests with propyne (methyl acetylene) can be easier to ignite using a spark than propane or butane. Ignition of propyne is possible with a spark of about 0.08 inches and a voltage of about 3000 volts. An ignition system with those characteristics can be much smaller than one that must ignite the more difficult to ignite fuels.

The spark can be provided by a small scale commercial spark ignition system that uses a DC-DC converter to step up voltage from battery voltage to the few hundred volts. The higher voltage is then used to charge a capacitor which discharges into the primary of a high volt stepup coil. The stepup coil secondary discharges directly to the spark plug. A solid-state electrical system rather than a piezoelectric or flint system can be used to provide a straightforward interface with a microcontroller that controls the spark.

A smaller ignition system can use a larger stepup in the DC-DC converter or by using an air core high voltage coil.

An onboard oxidizer can reduce the difficulty of ignition. By adding an oxidizer to the fuel, the volumetric energy content of the combustion chamber can be significantly increased. Also, the energy required to initiate ignition should be reduced. Experiments have been conducted with nitrous oxide ($N_2O$) since it is a relatively benign chemical and liquefies under pressure. The experiments have shown the expected increase in volumetric energy but have been inconclusive to date regarding the enhanced ignition. The use of an onboard oxidizer may be of much greater importance in smaller scale. As scale is reduced the low volumetric energy density of the fuel-air mixture will eventually reach the point where ignition cannot be initiated. At this scale the addition of even small amount of oxidizer may make ignition practical.

Purge Piston Design

The purge piston system relies on extracting energy from the expanding fuel vapor. Since the total amount of fuel can be about 60 micrograms per cc of combustion volume, the available energy can be quite small. This section discusses design of the purge piston. To simplify the resulting relationships all volumes have been normalized to the combustion volume and pressures have been normalized to atmospheric pressure. This means that volumes are expressed as a fraction of the combustion volume and pressures are expressed as a multiple of atmospheric pressure.

The expanding fuel can be analyzed at three different conditions. For each of these conditions, the pressure (P) and volume (v) of the fuel is indicated by the appropriate subscript. At condition 1, the fuel charge has been metered into the secondary piston but the secondary piston has not yet begun to move. As will be seen later, the assumption that the piston has not yet begun to move is unimportant in the final analysis. At condition 2, the secondary piston has moved full stroke providing the purge operation and is ready to vent into the combustion chamber. At condition 3, the fuel has entered the chamber and can be analyzed either by assuming the fuel is at atmospheric pressure with the appropriate resulting fuel volume based on fuel mass or is at the partial pressure of the fuel occupying the entire combustion volume. These two approaches are equivalent. In either case, this volume, normalized to combustion chamber volume, is equal to the specific fuel volume ($\delta$) discussed earlier. Throughout the cycle the expansions are considered to be isothermal due to the relatively slow speed and small volumes considered here. Isothermal expansion and conservation of mass leads to Equation prg1.

$$\delta = v_3 = P_1 v_1 \qquad \text{Equation prg1}$$

Equation prg1 looks a little unusual because no pressure term is associated with the final fuel volume ($v_3$). This is because both pressure and volume are unitless and the pressure of volume $v_3$ is atmospheric (multiplier of 1.0) so no pressure multiplier is required. The value of $v_3$ is determined by the stoichiometric fuel combustion equation and is the fuel-to-air mole ratio. For propane this is 0.04, for butane it is 0.031, and for propyne it is 0.05.

The volume $v_1$ is the dead volume of the secondary cylinder. When the fuel at condition 2 vents, it does so partly by the pressure present and partly by the motion of the secondary piston upward. After venting, a volume $v_1$ of fuel at atmospheric pressure remains in the purge cylinder dead volume. This results in Equation prg2.

$$\delta = P_2 v_2 - v_1 \qquad \text{Equation prg2}$$

One of the important parameters to be determined here is the size of the secondary piston. The piston should be sized to produce the maximum force on the purge piston. Since the stroke of the secondary piston and the purge piston are identical and the purge piston sweeps through the entire combustion volume then the ratio of the two piston swept volumes is equal to the ratio of the two piston areas. Defining the ratio of the secondary piston area to the purge piston area as a results in Equation prg3.

$$a = v_2 - v_1 \qquad \text{Equation prg3}$$

The force available to operate the purge piston is minimum at the end of the secondary piston stroke (condition 2).

The equivalent pressure on the purge piston (Peq) is defined as the ratio of purge piston force to purge piston area. Performing a force balance on the purge and secondary pistons and accounting for atmospheric pressure (subtracting 1 from the absolute pressure terms) results in Equation prg4.

$$P_{eq} - 1 = a(P_2 - 1) \qquad \text{Equation prg4}$$

Combining these last three relationships yields Equation prg5.

$$P_{eq} - 1 = a\left(\frac{\delta + v_1}{v_2} - 1\right) \qquad \text{Equation prg5}$$

Two of the important design parameters are the swept volume and the dead volume d of the secondary piston. The dead volume is the volume of the fuel at condition 1 is as in Equation prg6.

$$d = v_1 \qquad \text{Equation prg6}$$

The swept volume is the volume change between condition 1 condition 2, as in Equation prg3.
Combining yields Equation prg7.

$$P_{eq} - 1 = a\left(\frac{\delta + d}{a + d} - 1\right) = \frac{a}{a+d}(\delta - a) \qquad \text{Equation prg7}$$

This relationship determines the minimum amount of force available to operate the purge piston. This in turn provides guidelines for design of the secondary piston. First, the dead volume should be kept to minimum. This is not difficult since the fuel flow rates allow for the use of very small tubing and there can be zero head space on top of the secondary cylinder. Assuming that the dead volume can be made small compared to the swept volume, the relationship reduces to Equation prg8.

$$P_{eq} - 1 = \delta - a \qquad \text{Equation prg8}$$

In practice it is of interest to determine the size of the swept volume which produces the maximum equivalent pressure for a given dead volume size. This can be determined by setting the derivative of the equivalent pressure with respect to the dead volume equal to zero, as in Equation prg9.

$$\frac{d}{da}(P_{eq} - 1) = 0 = \frac{d}{da}\left[\frac{a}{a+d}(\delta - a)\right]$$
$$= \frac{\delta d - a^2 - 2ad}{(a+d)^2} \qquad \text{Equation prg9}$$

Solving for a yields Equation prg10.

$$a = d\left(1 + \sqrt{d + \delta}\right) \qquad \text{Equation prg10}$$

This is the optimal ratio of the area of the secondary piston to that of the primary piston. Even though the secondary piston area grows with increasing dead volume, the available force on the purge piston does not. The force is maximum at zero dead volume and drops rapidly with the increasing dead volume until the dead volume is about 0.5% of the combustion chamber volume. This corresponds to about 10% of the specific fuel volume. At this point, the available purge piston force is only half of the maximum possible force. For this reason it is important to keep the dead volume as small as possible.

This analysis shows that the purge piston design is possible but significant care must be taken to ensure that required operating force of the purge piston is small. This also shows that the maximum force can be obtained by using the largest volume (i.e., the smallest molecular weight) fuel. For example, propyne (also known as methyl acetylene or MAPP gas) has a $\delta$ of 0.05 so that the maximum possible purge piston gauge pressure is 0.05 atmospheres or 0.7 psig.

Power Piston Design

In addition to the purge piston, the design of the power piston is critical to the performance of the actuator. Two major areas can be considered. First, the piston can be sized to extract the maximum amount of work from the fuel. Second, the piston design can help to achieve maximum force for a single actuation.

The theoretical specific work extracted from the expanding combustion products is given by Equation pwr1.

$$\beta = \frac{P_c}{k-1}(1 - v^{1-k}) + P_a(1 - v) \qquad \text{Equation pwr1}$$

The maximum possible work is achieved by expanding to the point where the combustion chamber pressure equals atmospheric pressure. This occurs at the condition given by Equation pwr2.

$$v = \left[\frac{P_c}{P_a}\right]^{\frac{1}{k}} \qquad \text{Equation pwr2}$$

Figure 15:
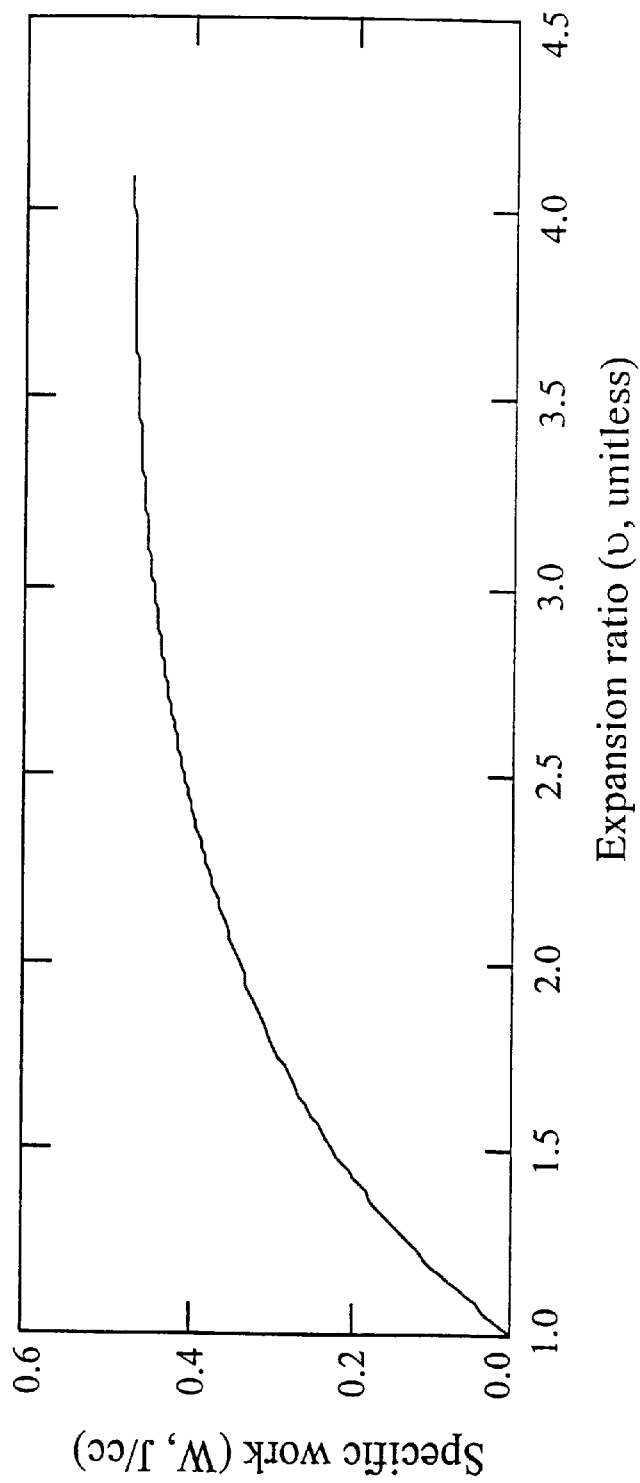
FIG. 15 is a graph of mechanical work as a function of combustion volume expansion.

This is an expansion ratio of about 4.08. However, the amount of work extracted is quite low for the last portion of the expansion. FIG. 15 is a graph of mechanical work as a function of combustion volume expansion. In fact an expansion ratio of 3.0 extracts 95% of the maximum work from the system. The lower expansion ratio significantly reduces the size of the actuator without affecting the work extracted.

Taking this observation one step further, the amount of work extracted can be optimized based on expanded volume rather than on the combustion volume as done before. Normalizing the work extracted to the expanded volume results in Equation pwr3.

$$\beta = \frac{1}{v}\left[\frac{P_c}{k-1}(1 - v^{1-k}) + P_a(1 - v)\right] \qquad \text{Equation pwr3}$$

This value is maximized at an expansion ratio of about 2.05. This means that the maximum work achieved as a function of total cylinder volume occurs at this expansion ratio. Experiments have shown that the maximum hop height occurs at an expansion ratio of about 2.6. The increasing expansion ratio over the theoretical value is possibly due to the dissociation effects in the combustion products discussed earlier. This would result in higher pressure over a longer stroke thereby increasing the optimum expansion ratio.

The use of nitrous oxide as an oxidizer changes the desired expansion ratio. The maximum possible work is achieved at a ratio of 5.9 and an expansion ratio of about 4 extracts 95% of the work. Interestingly enough, maximizing the work as a function of total cylinder volume gives an expansion ratio of 2.1 which is essentially identical to the ratio for the fuel-air combustion. This indicates that reasonable efficiency can be achieved using either fuel-air or fuel-nitrous oxide in the same actuator.

Fuel-Oxidizer Systems

There are at least two actuator designs that can take advantage of the use of an on-board oxidizer. The first comprises a very simple modification: a second fuel system can be added using a fuel tank and control valve and connecting it directly to the combustion chamber. The second system supplies oxidizer to the combustion volume. By using an on-board computer to adjust the time the oxidizer and fuel valves are open, continuous variation in the mix of fuel, air, and oxidizer can be achieved. This provides the capability for adjusting the actuation energy in real-time. The overall penalty to the actuator is small since the only additional hardware is the extra fuel system. As mentioned before, it requires about 20 times as much oxidizer as fuel to perform an actuation using stoichiometric fuel-oxidizer mixtures. This means that, for an oxidizer tank the same size as the on-board fuel tank, one actuation out of 20 could use the maximum amount of oxidizer. Since the increase in actuation energy for a stoichiometric fuel-oxidizer reaction is so large, the use of a fuel-oxidizer-air mixture may be very useful to maintain any large number of actuations at increased energy. If a specified total fuel mass suitable for about 10,000 actuations is divided equally between fuel and oxidizer about 5000 fuel-air actuations and 250 fuel-oxidizer actuations could be accomplished.

Figure 28:
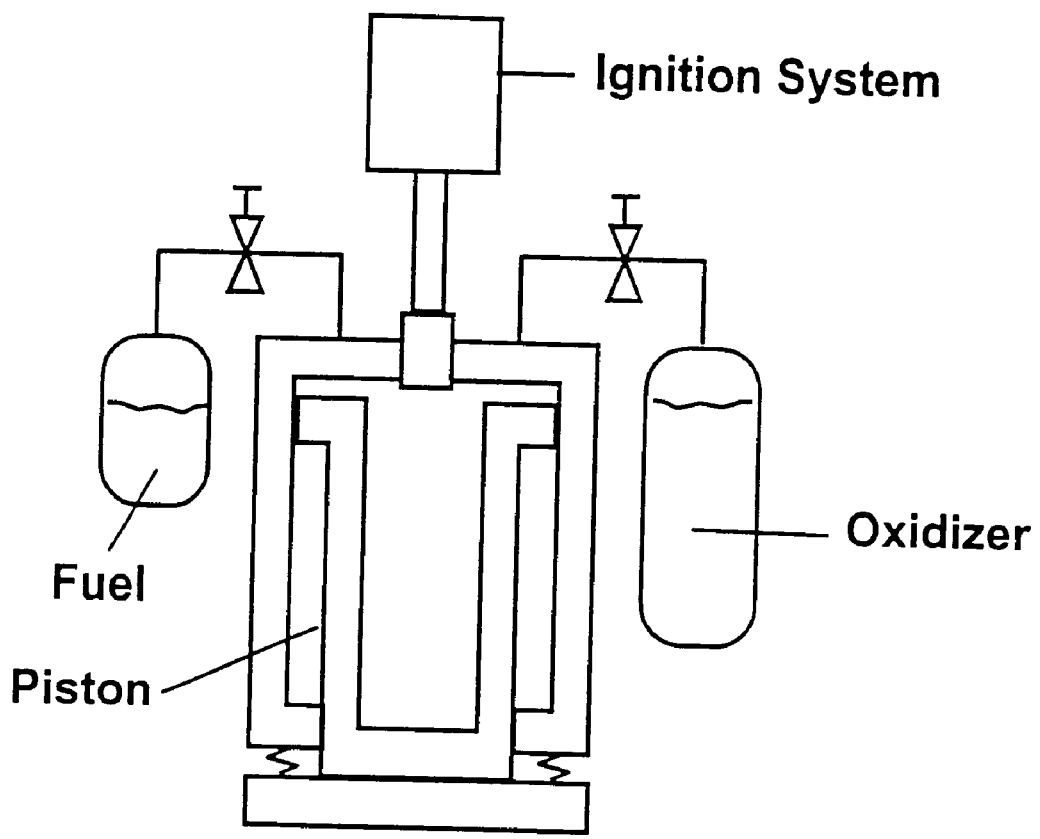
FIG. 28 is a schematic representation of a combustion-powered actuator.

A second type of actuator for the fuel-oxidizer reaction is an actuator that only uses a stoichiometric mix of fuel and oxidizer. This significantly increases the amount of consumables that must be carried on-board, but it also greatly simplifies the design of the actuator and in doing so reduces the actuator weight. FIG. 28 shows a conceptual design of a fuel-oxidizer system. Notice the complexities of the secondary piston, secondary cylinder, purge piston, moving fuel inlet are gone. Instead the actuator consists of a very simple piston cylinder arrangement with a return spring. In the dormant mode the piston is in the fully upright position, held there by the return spring. To operate the system, fuel and oxidizer are metered in at the appropriate rate and the introduction of these components under pressure pushes the piston downward. The valves are then closed and the mixture is ignited. Because the fuel and oxidizer are introduced in the proper mixture and the combustion volume is variable with the total amount introduced, variation in the actuation energy can be achieved by adjusting the amount of time that fuel-oxidizer is injected. One of the reasons why the oxidizer gives better performance is that the combustion reaction yields in net increase in the moles contained in the chamber after combustion and thereby increases the pressure. By using a significantly stronger return spring it is possible to increase the preignition pressure to perhaps two atmospheres. This can also serve to further enhance the performance of the actuator.

This very simple system is able to achieve misfire tolerance, cold start capability, and carburetion all because the oxidizer is now pressurized. This is a great simplification of the overall design and may prove more efficient than the fuel-air system. At some point there exists a breakeven point where the weight of the simplified oxidizer actuator is equal to that of the fuel-air actuator at a given range. Beyond this range the fuel-air actuator will have the advantage and at shorter ranges the fuel-oxidizer actuator will be more attractive.

Maximizing Vehicle Range

In order to achieve maximum range with a given size vehicle and fuel mass several parameters must be considered. These include the overall vehicle mass, the mass of the power piston, and the use of mechanical energy to achieve range. The previous derivations show the maximum amount of mechanical work available from the adiabatic expansion of the combustion products. As the combustion products expand, the pressure produces a force on the power piston which pushes directly against the ground. At the end of the power piston stroke, the body of the vehicle is moving at a velocity determined by the energy extracted from the expansion but the power piston, rod and foot are still at zero velocity. Calling the mass of the body $m_b$, the mass of the power piston $m_p$, and the total mechanical energy extracted from expansion E, the relation between the energy and the velocity of the body at the end of the power piston stroke is given by Equation mx1.

$$E = \frac{1}{2}m_b v_b^2 \qquad \text{Equation mx1}$$

At the end of the power stroke, the piston is still stationary. When the moving vehicle body contacts the stationary piston, momentum is conserved resulting in Equation mx2.

$$m_b v_b = (m_b + m_p)v \qquad \text{Equation mx2}$$

From Equation mx2, the fraction of total energy available to propel the hopper is given by Equation mx3.

$$E_{out} = \frac{1}{2}(m_b + m_p)v^2 \qquad \text{Equation mx3}$$
$$= \frac{1}{2}\frac{m_b^2 v_b^2}{(m_b + m_p)} = \frac{m_b E}{(m_b + m_p)} =$$

So the ratio of available energy for the hop to total expansion energy is equal to the ratio of hopper body mass to total mass.

Directional Hopping

An important issue in attaining a range via hopping is that of launching the robot at an angle. This requires some system to tilt the hopper body in the proper direction. At first glance this would appear to require an actuator capable of moving the hopper. However since a single mission requires several thousand hops, it can be undesirable to expend this amount of energy to steer the hopper. Instead a vertical to horizontal transducer has been devised where the direction of the hopper is controlled by rotation of a crooked or offset foot.

The steerable vertical to horizontal transducer is less complex and requires less power than two degree of freedom tilt mechanisms. Vertical energy is translated into horizontal motion by a foot that causes vertical actuation to generate a moment orthogonal to the vertical actuation axis and further can cause the actuation axis to tilt from vertical. Changing the direction of horizontal motion requires only that the foot be rotated about the actuation axis, a one degree of freedom actuation well-suited for low-cost, low-energy applications.

Figure 22A:
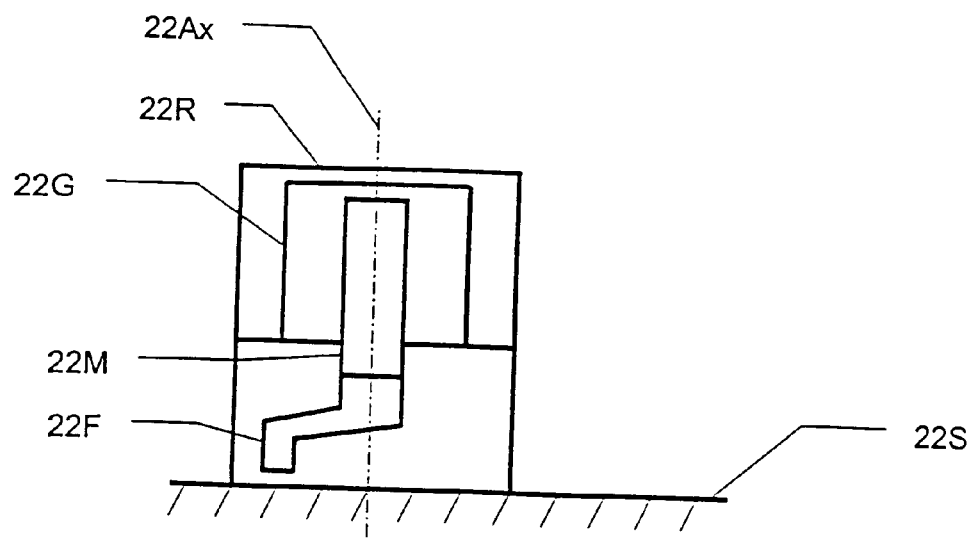
FIGS. 22(*a,b,c,d*) are sectional views of a robot with horizontal and vertical hopping mobility.
Figure 22B:
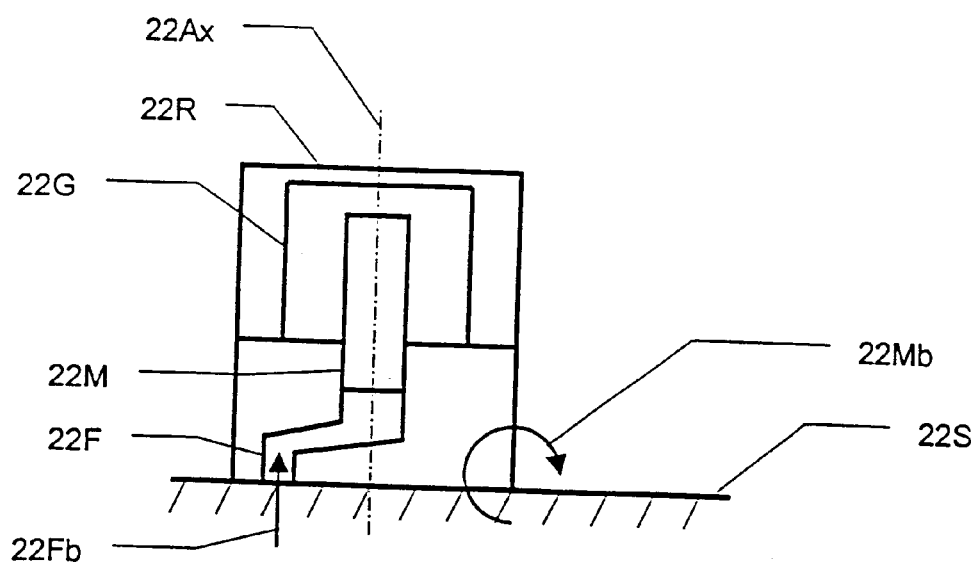

FIG. 22a is a sectional view of one embodiment of a steerable vertical to horizontal transducer. A mobile robot 22R rests on a supporting surface 22S. Robot 22R comprises a force generator 22G, which in turn comprises a member 22M mobile with respect to robot 22R along actuation axis 22X. Actuation axis 22X is substantially vertical when robot 22R is at rest on support surface 22S. Foot 22F mounts with mobile member 22M, and is shaped so that, when mobile member 22M moves toward support surface 22S, foot 22F will initially contact support surface 22S at a point off axis 22X.

FIGS. 22(b,c,d) illustrate the embodiment of FIG. 22a in operation. FIG. 22b is a sectional view of the embodiment just as foot 22F contacts support surface 22S. Force generator 22G generates a force along actuation axis 22X. The on-axis force is transferred to support surface 22S via foot 22F, generating a substantially vertical force 22Fb acting on robot 22R and a moment 22Mb orthogonal to actuation axis 22X. Force 22Fb imparts a substantially vertical acceleration to robot 22R; moment 22Mb imparts an angular acceleration to robot 22R.

Figure 22C:
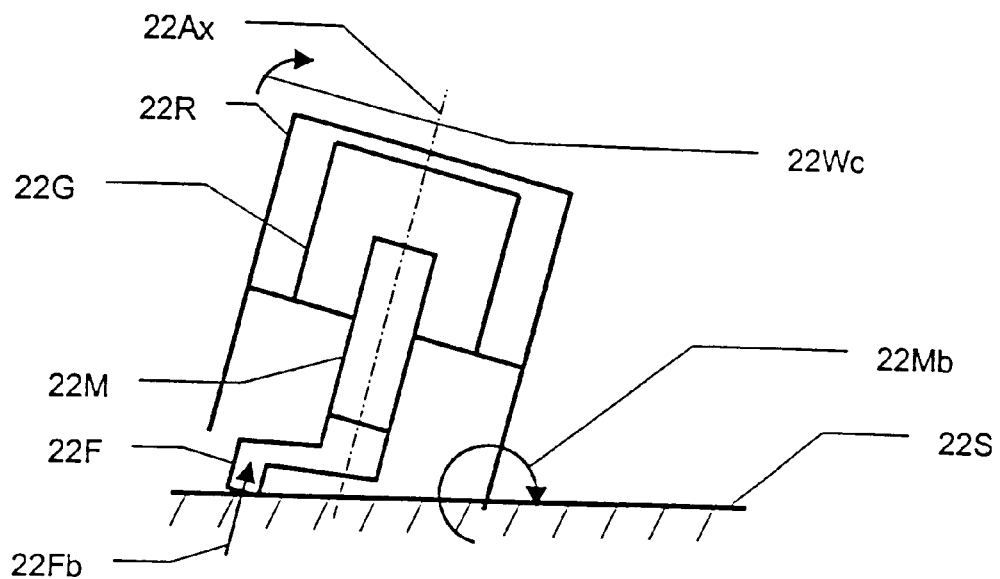

FIG. 22c is a sectional view of robot 22R after the foot has contacted support surface 22S. On-axis force from force generator 22G still generates moment 22Mc orthogonal to actuation axis 22X. Actuation axis 22X has tilted from FIG. 22b, however, due to the angular velocity 22Wc imparted by moment 22Mb. Force 22Fc on the robot, while still along actuation axis 22X, now has both horizontal and vertical components, imparting horizontal and vertical acceleration to robot 22R.

Figure 22D:
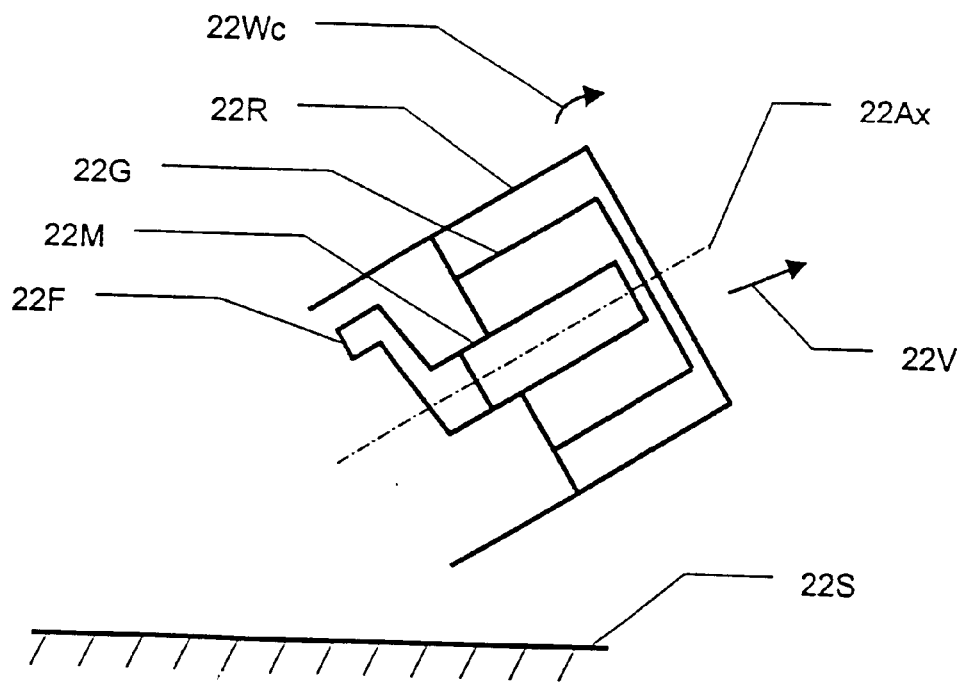

FIG. 22d is a sectional view of robot 22R after robot 22R and foot 22F have moved beyond contact with support surface 22S. Robot 22R travels with velocity 22V, having both vertical and horizontal components due to vertical and horizontal accelerations discussed above. Robot 22R also has angular rotation 22Wd due to the orthogonal moment discussed above. The interaction of force generator 22G with support surface 22S through foot 22F has transformed force, initially substantially vertical, into velocity with both vertical and horizontal components, without requiring any energy input for tilting or orienting force generator 22G other than the on-axis actuation required for hopping.

Figure 23A:
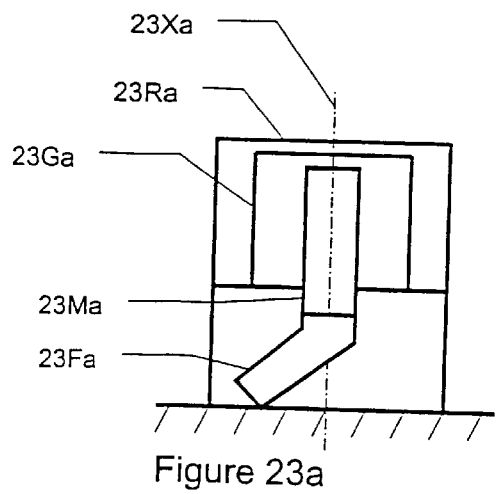
FIGS. 23(*a,b,c*) are sectional views of a robot with horizontal and vertical hopping mobility.
Figure 23B:
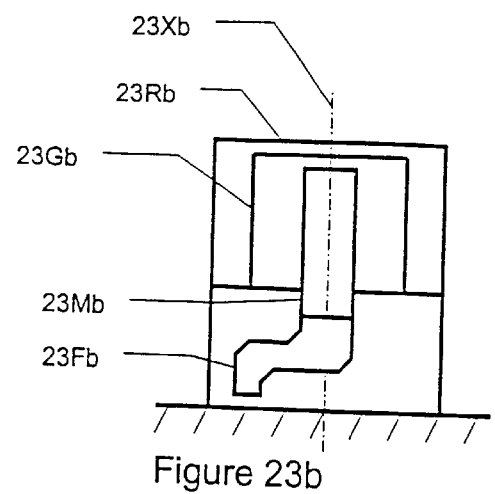
Figure 23C:
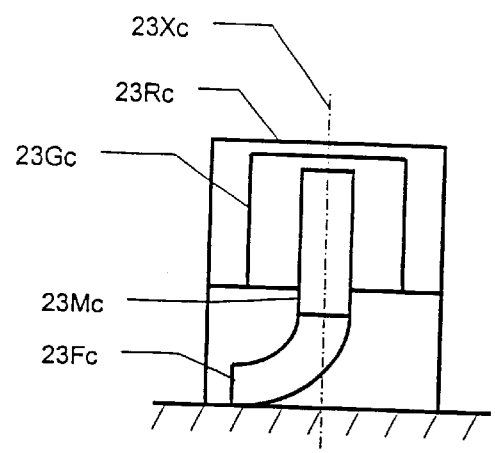

FIGS. 23(a,b,c) are sectional views of alternative embodiments that operate similarly to the embodiment of FIG. 22a. Those skilled in the art will appreciate other embodiments from the disclosure here and practice of the invention. FIG. 23a shows foot 23Fa formed by angling an end of mobile member 23Ma away from actuation axis 23Xa. FIG. 23b shows foot 23Fb formed by curving or bending an end of mobile member 23Mb to displace the terminal end away from actuation axis 23Xb. FIG. 23c shows foot 23Fc formed by curving just the terminal portion of mobile member 23Mc away from actuation axis 23Xc.

Figure 24A:
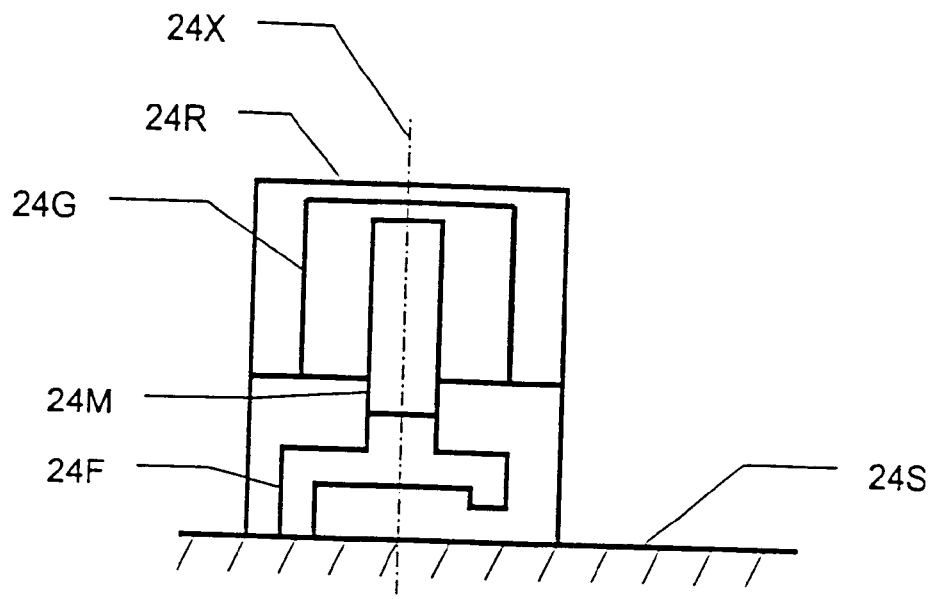
FIGS. 24(*a,b,c,d*) are sectional views of a robot with horizontal and vertical hopping mobility.
Figure 24B:
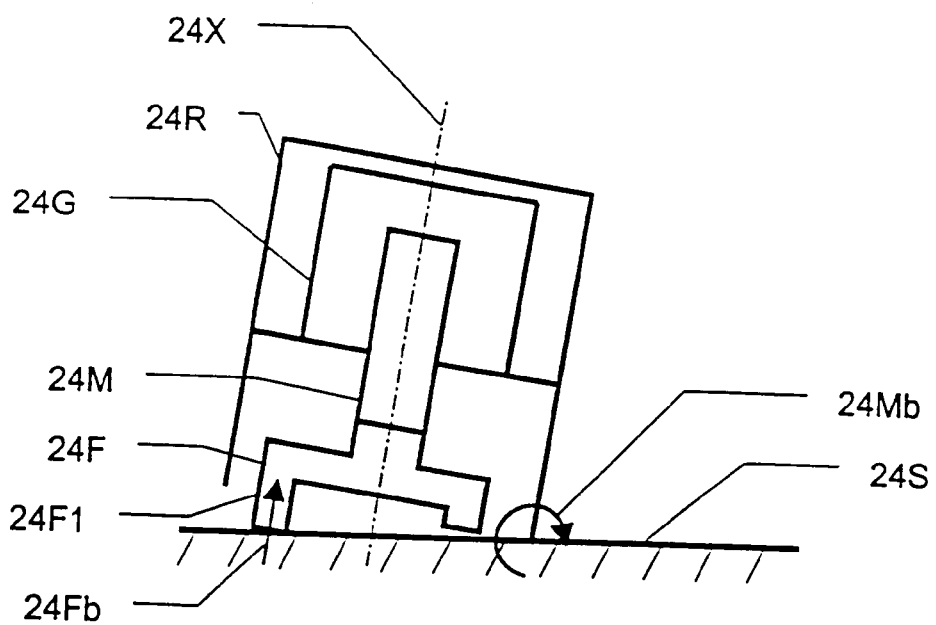

FIG. 24a is a sectional view of one embodiment of the present invention. A mobile robot 24R rests on a supporting surface 24S. Robot 24R comprises a force generator 24G, which in turn comprises a member 24M mobile with respect to robot 24R along actuation axis 24X. Actuation axis 24X is substantially vertical when robot 24R is at rest on support surface 24S. Foot 24F mounts with mobile member 24M, and is shaped so that, when mobile member 24M moves toward support surface 24S, foot 24F will initially contact support surface 24S at a point off axis 24X. Foot 24F is further shaped so that as robot 24R tilts due to a moment from off-axis contact, a second portion of foot 24F will contact support surface 24S and reduce or eliminate the moment.

FIGS. 24(b,c,d) illustrate the embodiment of FIG. 24a in operation. FIG. 24b is a sectional view just as a first portion 24F1 of foot 24F contacts support surface 24S. Force generator 24G generates a force along actuation axis 24X. The on-axis force is transferred to support surface 24S via foot 24F, generating a substantially vertical force 24Fb acting on robot 24R and a moment 24Mb orthogonal to actuation axis 24X. Force 24Fb imparts a substantially vertical acceleration to robot 24R; moment 24Mb imparts an angular acceleration to robot 24R.

Figure 24C:
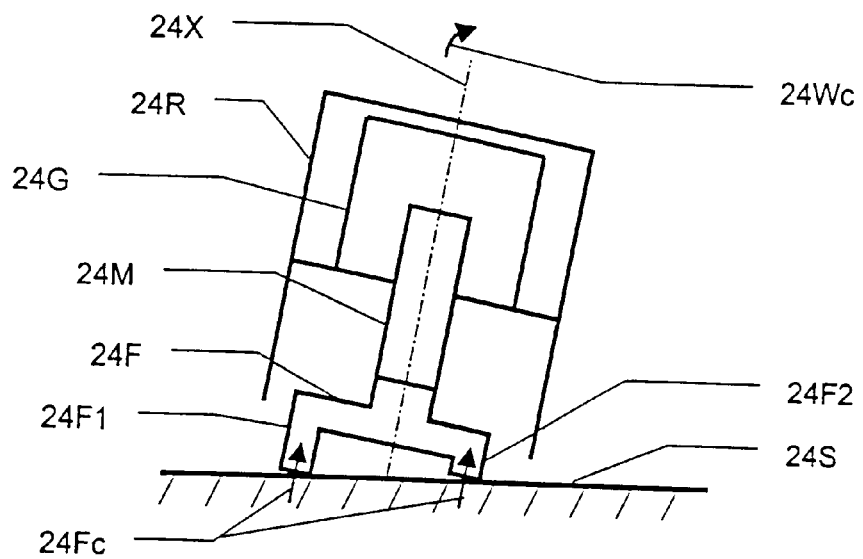

FIG. 24c is a sectional view of robot 24R after a second portion 24F2 of foot 24F has contacted support surface 24S. Actuation axis 24X has tilted from FIG. 24b due to the angular velocity 24Wc imparted by moment 24Mb. The tilt brings the second portion of foot 24F into contact with support surface 24S, generating a moment that works to counteract the moment from the initial contact. The reduced or eliminated net moment reduces or eliminates the angular velocity 24Wc, stabilizing the ultimate angular orientation of robot 24R. Force 24Fc on the robot, while still along actuation axis 24X, now has both horizontal and vertical components, imparting horizontal and vertical acceleration to robot 24R.

Figure 24D:
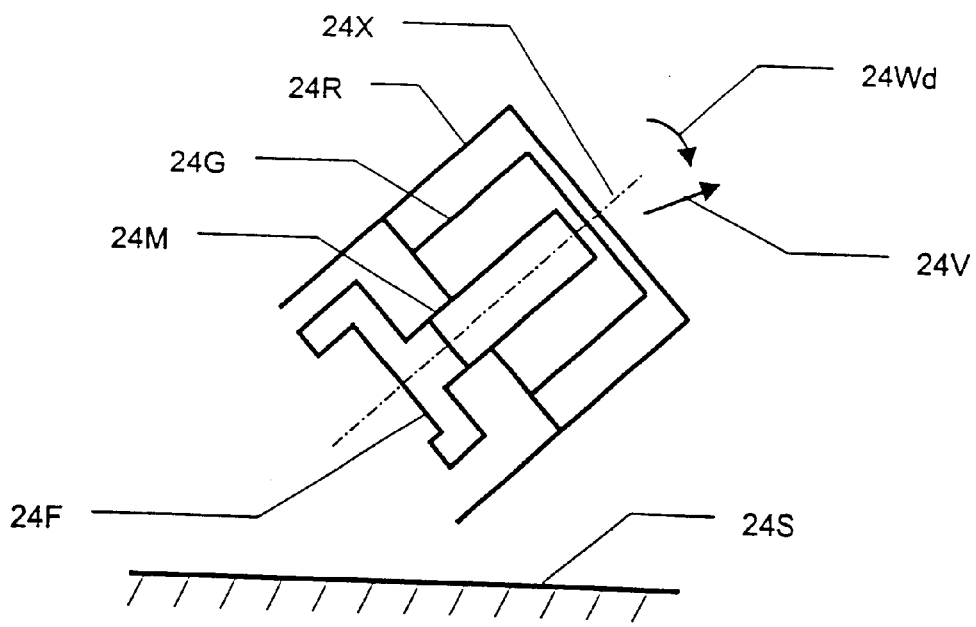
Figure 25A:
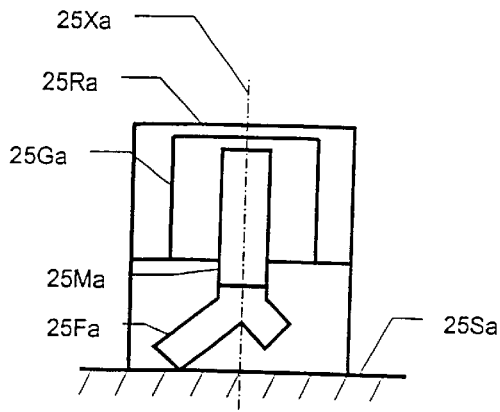
FIGS. 25(*a,b,c,d*) are sectional views of a robot with horizontal and vertical hopping mobility.
Figure 25B:
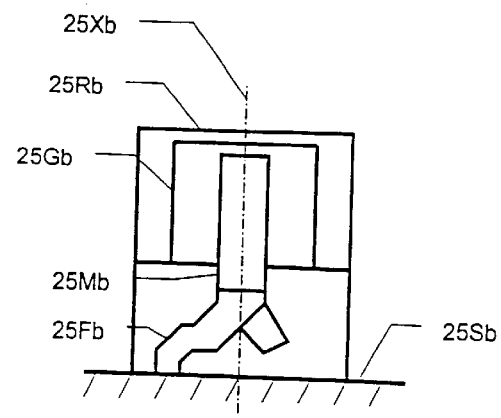
Figure 25C:
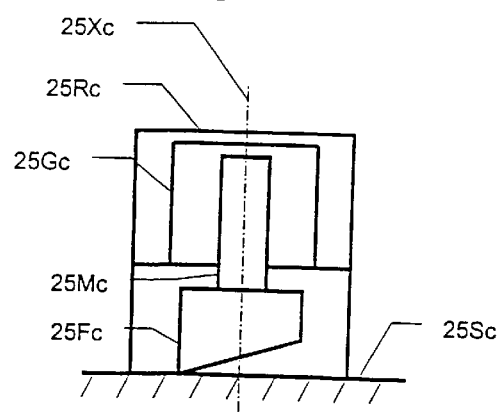
Figure 25D:
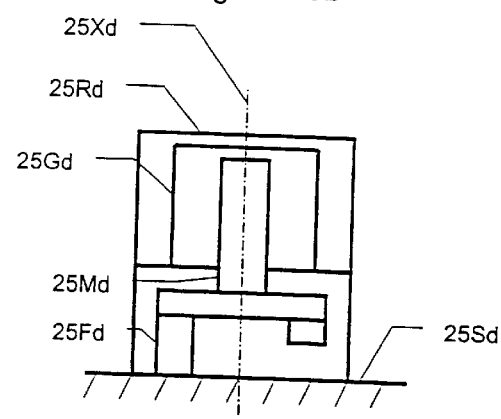

FIG. 24d is a sectional view of robot 24R after robot 24R and foot 24F have moved beyond contact with support surface 24S. Robot 24R travels with velocity 24V, having both vertical and horizontal components due to vertical and horizontal accelerations discussed above. Robot 24R also can have angular rotation 24W due to the moments discussed above. The reduced or eliminated angular velocity reduces the final rotation rate of robot 24R, important if tumbling in flight or on landing impairs operation of robot 24R. Reduced final rotation rate can also improve the overall efficiency of the robot because less energy is wasted in imparting rotation to the robot. The interaction of force generator 24G with support surface 24S through foot 24F has transformed force, initially substantially vertical, into velocity with both vertical and horizontal components, without requiring any energy input for tilting or orienting force generator 24G3 other than the on-axis actuation required for hopping.

The first 24F1 and second 24F2 portions of foot 24F define a line inclined at an angle to actuation axis 24X. The angle of inclination can be a tradeoff between competing considerations: greater angles can lead to relatively larger horizontal components of motion, but too great an angle and the foot can slip and fall instead of hopping. The angle where such slipping occurs is related to the coefficient of fraction between the foot and the supporting surface. Some analysis indicates that about 30 degrees can provide desirable performance. Hopping on steep hills further complicates the determination of a suitable angle: a 30 degree foot, hopping on a 30 degree slope, can produce a net vertical hop. Accordingly, an offset foot like that of FIGS. 22 and 23 can be desirable if steep slopes are anticipated.

FIGS. 25(a,b,c,d) are sectional views of alternative embodiments that operate similarly to the embodiment of FIG. 24a. Those skilled in the art will appreciate other embodiments from the disclosure here and practice of the invention. FIG. 25a shows foot 25Fa formed by angling an end 25Fa1 of mobile member 25Ma away from actuation axis 25Xa, and having a stub 25Fa2 angled in an opposing direction from actuation axis 25Xa. FIG. 25b shows foot 25Fb formed by curving or bending an end of mobile member 25Mb to displace the terminal end away from actuation axis 25Xb, and by extending mobile member 25Mb past the initial bend. FIG. 25c shows foot 25Fc with a substantially uniform cross section along actuation axis 25Xc, with the end of foot 25Fc shaped according to a plane, inclined relative to actuation axis 25Xc, passed through the cross section. FIG. 25d shows foot 25Fd formed by mounting a strut with mobile member 25Md and having two posts mounted therewith: a first post on one side of actuation axis 25Xd, and a second post on the opposite side of actuation axis 25Xd. The lengths and radial distances of the two posts can be varied to attain various force and moment relationships desired for specific applications.

Steering

Figure 26A:
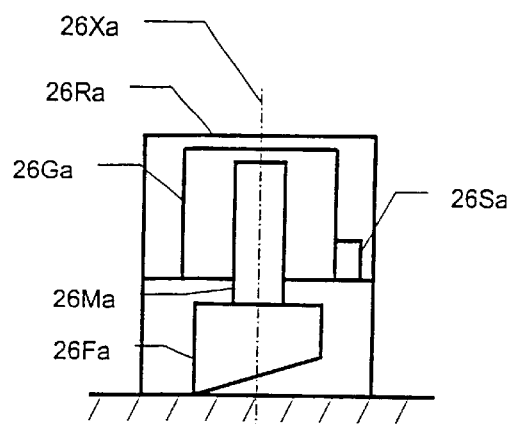
FIGS. 26(*a,b,c*) are schematic representations of several steering mechanisms for robots with horizontal-vertical hopping mobility.

FIGS. 26(a,b,c) are schematic representations of several steering mechanisms according to the present invention. In FIG. 26a a foot 26Fa is rigidly mounted with an actuator 26Aa. The actuator-foot assembly can rotate relative to the overall robot 26Rb by the action of a rotator 26Sa. Rotating foot 26Fa relative to robot 26Ra allows the direction of hop to be changed. Rotator 26Sa can be, for example, a stepper motor or other device known to those skilled in the art.

Figure 26B:
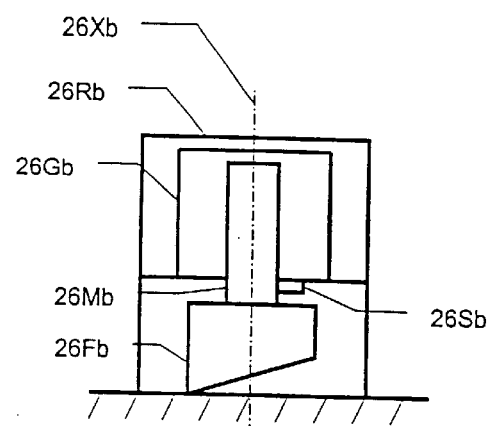

In FIG. 26b a foot 26Fb is rigidly mounted with a mobile member of an actuator 26Ab. Actuator 26Ab is mounted with robot 26Rb in a fixed angular orientation. The member-foot assembly can rotate relative to the actuator 26Ab by the action of a rotator 26Sb. Rotator 26Sb can be, for example, a stepper motor or other device known to those skilled in the art.

Figure 26C:
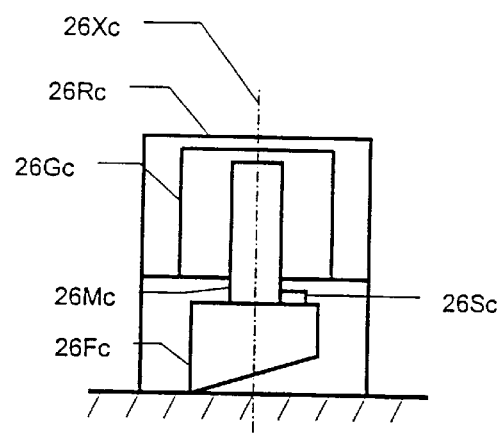

In FIG. 26c a foot 26Fc is rotably mounted with a mobile member of an actuator 26Ac. Mobile member and actuator 26Ac are mounted with robot 26Rc in a fixed angular orientation. Foot 26Fc can rotate relative to mobile member and actuator 26Ac by the action of a rotator 26Sc. Rotator 26Sc can be, for example, a stepper motor or other device known to those skilled in the art.

Figure 27:
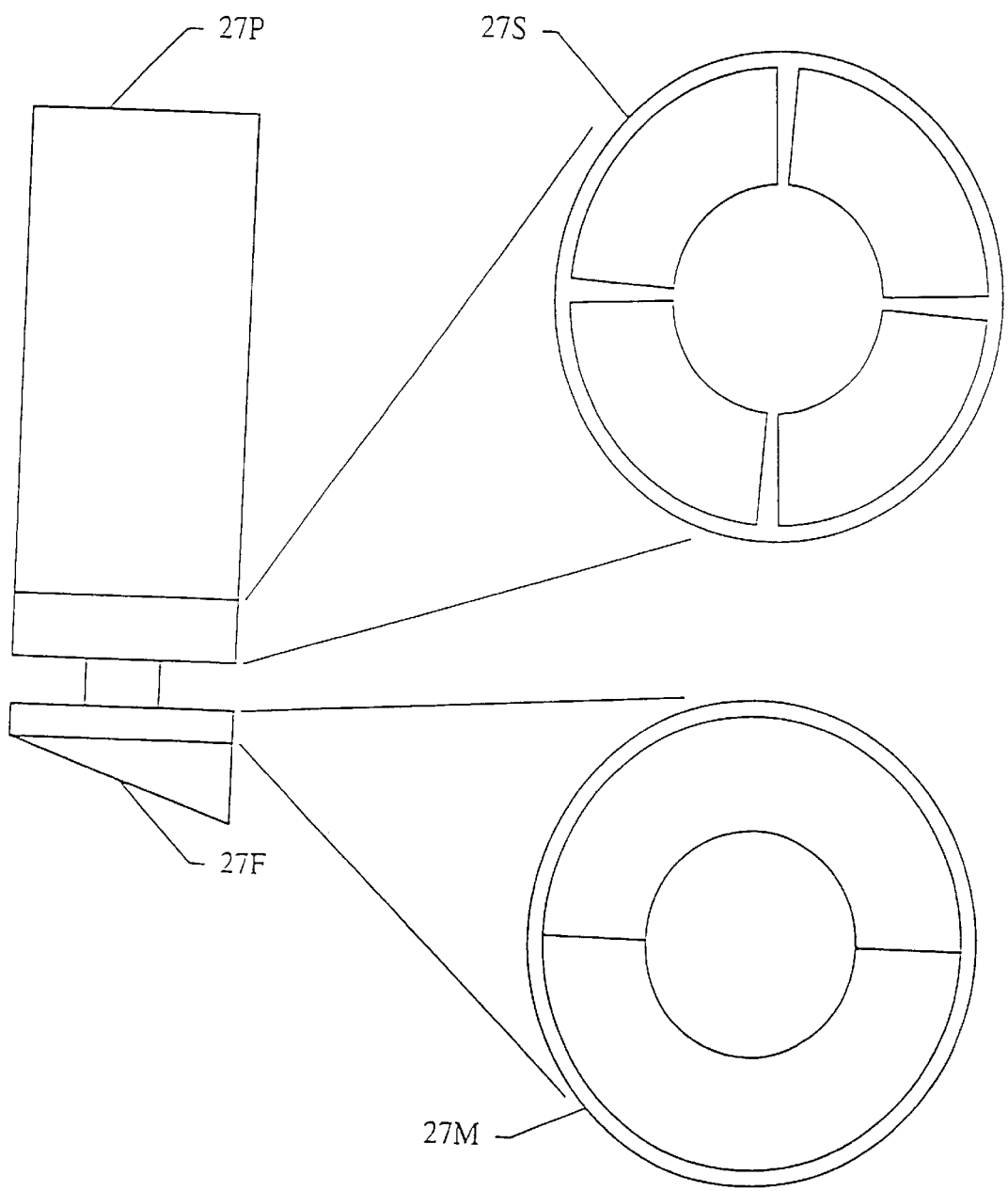
FIG. 27 is an illustration of a steerable directional transducer.

FIG. 27 is a schematic representation of a steering mechanism according to the present invention. A foot 27F mounts with a piston 27P associated with a robot (not shown). Foot 27F comprises a magnetic plate 27M. A plurality of coils 27S (four in the figure) mount with the piston 27P. The coils can be selectively energized to interact with the magnetic plate 27M and position foot 27F at one of various angular orientations. The embodiment in the figure can require low energy to accomplish steering, and does not require significant increase in the height of the overall robot.

The permanent magnet 27M can be a 2 pole magnet that has been polarized perpendicular to the plane. Two poles can be used so that the orientation is uniquely specified when the appropriate coils are energized.

The number of stator coils 27S determines the angular resolution per step. For example, a 90 degree resolution can be achieved with 4 coils. A 45 degree resolution can be achieved with 8 coils.

The maximum torque of the motor is approximately given by equation step1.

$$T_{max} = \frac{N^2 i^2 \mu_o A_c}{2\pi g} \qquad \text{Equation step 1}$$

In equation step1 N is the number of coil turns, i is the current applied to the coil, $\mu_o$ is the permeability of air, $A_c$ is the cross sectional area of the coil, and g is the gap between the coil and the permanent magnet. For maximum torque, it is desirable to minimize g, and maximize $A_c$ and the magnetomotive force Ni. The cross sectional area of the coil is a function of the number of stator coils, and it is given by equation step2.

$$A_c = \frac{\pi}{n}(r_2^2 - r_1^2) \qquad \text{Equation step 2}$$

In equation step2, n is the number of stator coils, $r_1$ and $r_2$ are the inner and outer radii of the coil on the circular foot. To maximize $A_c$, we can to maximize $r_2$ and minimize $r_1$. These are constrained by the outer dimensions of the piston and the rod connected to the foot.

The number of coil turns N should be chosen so that the impedance of the coil matches the impedance of the drive electronics for maximum power to be delivered to the coil. However, if the same battery source is connected to the robot microcontroller, unlimited current when pulsing the motor coils can reboot the microcontroller. If the drive voltage is V and the maximum current is $i_{max}$, then the resistance of the coil should be greater than or equal to $V/i_{max}$. The coil resistance is given by equation step3.

$$R = \frac{\rho l_w}{A_w} \qquad \text{Equation step 3}$$

In equation step3, $\rho$ is the resistivity of the wire in ohm-mm, $l_w$ is the length of the wire in mm, and $A_w$ is the cross sectional area of the wire in $mm^2$. The length of the wire is approximately given by equation step4.

$$l_w = \left[2(r_2 - r_2) + \frac{2\pi}{n}(r_1 + r_2)\right]N \qquad \text{Equation step 4}$$

The cross sectional area of the wire is given by equation step5.

$$A_w = \pi \left(\frac{D}{2}\right)^2 \qquad \text{Equation step 5}$$

In equation step5, D is the diameter of the wire. Combining the above expressions, the resistance of the coil is given by equation step6.

$$R = \frac{4\rho \left[2(r_2 - r_1) + \frac{2\pi}{n}(r_1 + r_2)\right]N}{\pi D^2} \geq \frac{V}{i_{max}} \qquad \text{Equation step 6}$$

Therefore, the number of turns in the coil should be as in equation step7.

$$N \geq \frac{\pi D^2 V}{4\rho \left[2(r_2 - r_1) + \frac{2\pi}{n}(r_1 + r_2)\right] i_{max}} \qquad \text{Equation step 7}$$

We also need to consider the torque required to turn the foot. Assuming the bearing on the foot is frictionless, the torque is given by equation step8.

$$T = I_z \ddot{\theta} \qquad \text{Equation step 8}$$

In equation step8, $I_z$ is the moment of inertia about the rod, and $\theta$ is the angular acceleration about the rod. For a cylindrical foot (neglecting the sloped portion), the moment of inertia is given by equation step9.

$$I_z = \frac{1}{2} m r^2 \qquad \text{Equation step 9}$$

In equation step9, m is the mass of the foot, and r is the radius. Assuming a constant acceleration/deceleration over a specified distant $\theta$ for time t, the angular acceleration is given by equation step10.

$$\ddot{\theta} = \frac{4\theta}{t^2} \qquad \text{Equation step 10}$$

Therefore, the torque required to turn the motor is given by equation step11.

$$T = \frac{2m\theta r^2}{t^2} \qquad \text{Equation step 11}$$

The torque given in Equation step11 must be less than the torque given in Equation step1.

Efficiency

Perhaps the most straightforward way to maximize the range of hopper is to extract the maximum mechanical energy from the combustion products. One way to do this is to minimize leakage of the pressurized combustion products. Because the duration of a hop is relatively long (20–30 ms) there is a potential for significant leakage. Early hopper designs used simple slip fit cylinders with a clearance of 0.001 inches. Experiment and analysis has shown that up to 50% of the combustion products can be lost through this clearance. Suitable solutions to this problem include ground cylinders and pistons or flexible lip seals. Either approach provides adequate sealing but the flexible seal allows for a lighter weight piston and cylinder since the two need not be absolutely round.

One other potential means for energy loss is radiative heat loss to the walls of the cylinder. Assuming that the combustion products are a perfect emitter, the temperature of the gas will drop by several hundred degrees Kelvin during the first few milliseconds after combustion. During early experiments this was thought to be primary factor in reducing the overall efficiency of the system Experiments were tried with low emissivity cylinder walls to decrease the loss and have proven to have no effect on efficiency. Later observations of the combustion show that the flame color is blue meaning that the emissivity in the red (and probably infrared) region is negligible. This means that the radiative heat loss to the wall is small because of the very low emissivity of the combustion products. This is borne out by published data that shows a very low absorption in the infrared region of these gases.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A steerable energy transducer for a mobile robot, comprising:
   a) a force generator, generating force along an actuation axis and having a member mobile along the actuation axis with respect to the force generator;
   b) a foot mounted with the mobile member and shaped so that as the mobile member moves toward the support surface the foot contacts the support surface at a point off the actuation axis before any contact along the actuation axis between the support surface and either the foot or the mobile member;
   c) an actuator adapted to mount with said robot for rotating said foot about an axis substantially parallel to the actuation axis relative to said robot;
   wherein said foot has a substantially uniform cross section extending along the actuation axis, and wherein said foot is mounted substantially coaxial with said actuation axis, and wherein the end of said foot distal said mobile member has a shape truncated at its perimeter by a plane inclined relative to the actuation axis.

2. The transducer of claim 1, wherein said plane is inclined at an angle between about ten degrees and about 40 degrees.

3. The transducer of claim 1, wherein said plane is inclined at an angle of substantially thirty degrees.

4. A robot with hopping mobility, comprising:
   a) a self-righting faceted cage;
   b) a linear actuator gimbal mounted with the cage, comprising a member mobile along an actuation axis with respect to the robot;
   c) a force transducer adapted to impart acceleration to the robot responsive to the linear actuator, comprising a foot mounted with the mobile member and shaped so that as the mobile member moves toward the support surface the foot contacts the support surface at a point off the actuation axis before any contact along the actuation axis between the support surface and either the foot or the mobile member.

5. The robot of claim 4, wherein said foot comprises:
   a) a strut mounted with the mobile member and extending therefrom at an angle to the actuation axis; and
   b) a first post mounted with the strut distal from the actuation axis and extending from the strut in a direction parallel to the actuation axis a distance that places the first post closer to the support surface, measured parallel to the actuation axis, than the strut and than the mobile member.

6. The robot of claim 5, wherein said foot further comprises a second post mounted with the strut at a point substantially colinear with the actuation axis and the first post and at a lesser radial distance from the actuation axis than the first post, wherein said second post extends from the strut in a direction parallel to the actuation axis a distance that places the second post closer to the support surface, measured parallel to the actuation axis, than the strut and the mobile member, and farther from the actuation axis, measured parallel to the actuation axis, than the first post.

7. The robot of claim 4, wherein said foot has a substantially uniform cross section extending along the actuation axis, and wherein said foot is mounted substantially coaxial with said actuation axis, and wherein the end of said foot distal said mobile member has a shape truncated at its perimeter by a plane inclined relative to the actuation axis.

8. The robot of claim 4, wherein said foot is rotably mounted with said mobile member, and further comprising an actuator mounted with said robot to rotate said foot relative to said mobile member.

9. The robot of claim 4, wherein said mobile member is rotably mounted with said linear actuator, and further comprising an actuator mounted with said robot for rotating said mobile member relative to said linear actuator.

10. The robot of claim 4, wherein said linear actuator is rotably mounted with said robot, and further comprising an actuator mounted with said robot for rotating said force generator relative to said robot.

11. The robot of claim 4, wherein said transducer comprises:
   a) a foot mounted with the mobile member and shaped so that as the mobile member moves toward the support surface the foot contacts the support surface at a point off the actuation axis before any contact along the actuation axis between the support surface and either the foot or the mobile member,
   b) an actuator mounted with said robot for rotating said foot relative to said robot.

12. The robot of claim 11, wherein said foot comprises:
   a) a strut mounted with the mobile member and extending therefrom at an angle to the actuation axis; and
   b) a first post mounted with the strut distal from the actuation axis and extending from the strut in a direction parallel to the actuation axis a distance that places the first post closer to the support surface, measured parallel to the actuation axis, than the strut and than the mobile member.

13. The robot of claim 12, wherein said foot further comprises a second post mounted with the strut at a point substantially colinear with the actuation axis and the first post and at a lesser radial distance from the actuation axis than the first post, wherein said second post extends from the strut in a direction parallel to the actuation axis a distance that places the second post closer to the support surface, measured parallel to the actuation axis, than the strut and the mobile member, and farther from the actuation axis, measured parallel to the actuation axis, than the first post.

14. The robot of claim 11, wherein said foot has a substantially uniform cross section extending along the actuation axis, and wherein said foot is mounted substantially coaxial with said actuation axis, and wherein the end of said foot distal said mobile member has a shape truncated at its perimeter by a plane inclined relative to the actuation axis.

15. The robot of claim 14, wherein said foot is rotably mounted with said mobile member, and wherein said actuator rotates said foot relative to said mobile member.

16. The robot of claim 14, wherein said mobile member is rotably mounted with said linear actuator, and wherein said actuator rotates said mobile member relative to said linear actuator.

17. The robot of claim 14, wherein said linear actuator is rotably mounted with said robot, and wherein said actuator rotates said linear actuator relative to said robot.

18. The robot of claim 14, wherein said plane is inclined at an angle between about ten degrees and about 40 degrees.

19. The robot of claim 14, wherein said plane is inclined at an angle of substantially thirty degrees.

20. The robot of claim 4, wherein said foot comprises:
   a) a strut mounted with the mobile member and extending therefrom at an angle to the actuation axis; and
   b) a first post mounted with the strut distal from the actuation axis and extending from the strut in a direction parallel to the actuation axis a distance that places the first post closer to the support surface, measured parallel to the actuation axis, than the strut and than the mobile member.

21. The robot of claim 20, wherein said foot further comprises a second post mounted with the strut at a point substantially colinear with the actuation axis and the first post and at a lesser radial distance from the actuation axis than the first post, wherein said second post extends from the strut in a direction parallel to the actuation axis a distance that places the second post closer to the support surface, measured parallel to the actuation axis, than the strut and the mobile member, and farther from the actuation axis, measured parallel to the actuation axis, than the first post.

22. The robot of claim 4, wherein said foot has a substantially uniform cross section extending along the actuation axis, and wherein said foot is mounted substantially coaxial with said actuation axis, and wherein the end of said foot distal said mobile member has a shape truncated at its perimeter by a plane inclined relative to the actuation axis.

23. The robot of claim 22, wherein said foot is rotably mounted with said mobile member, and wherein said actuator rotates said foot relative to said mobile member.

24. The robot of claim 22, wherein said mobile member is rotably mounted with said linear actuator, and wherein said actuator rotates said mobile member relative to said linear actuator.

25. The robot of claim 22, wherein said linear actuator is rotably mounted with said robot, and wherein said actuator rotates said linear actuator relative to said robot.

26. The robot of claim 22, wherein said plane is inclined at an angle between about ten degrees and about 40 degrees.

27. The robot of claim 22, wherein said plane is inclined at an angle of substantially thirty degrees.

* * * * *